United States Patent
Allen et al.

(10) Patent No.: US 11,507,257 B2
(45) Date of Patent: Nov. 22, 2022

(54) USER INTERFACES FOR REPORTING INCIDENTS

(71) Applicant: Apple Inc., Cupertino, CA (US)

(72) Inventors: Darious LeJuan Allen, San Francisco, CA (US); Brian J. Andrich, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/323,804

(22) Filed: May 18, 2021

(65) Prior Publication Data

US 2021/0357091 A1 Nov. 18, 2021

Related U.S. Application Data

(60) Provisional application No. 63/026,640, filed on May 18, 2020.

(51) Int. Cl.
| | |
|---|---|
| *G06F 3/0484* | (2022.01) |
| *G01C 21/36* | (2006.01) |
| *G06F 3/0481* | (2022.01) |

(52) U.S. Cl.
CPC ......... *G06F 3/0484* (2013.01); *G01C 21/367* (2013.01); *G06F 3/0481* (2013.01)

(58) Field of Classification Search
CPC .... G06F 3/0484; G06F 3/0481; G01C 21/367
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,289,187 B1 * | 10/2012 | Kerr ..................... G08G 1/0969 340/905 |

(Continued)

FOREIGN PATENT DOCUMENTS

| | | | |
|---|---|---|---|
| CA | 2559684 C | * 12/2013 | |
| CN | 107430006 B | * 3/2021 | ............. G01C 21/32 |

(Continued)

OTHER PUBLICATIONS

Waze banned in Germany? Not really . . . , Feb. 21, 2020, URL—https://www.wazebelgium.be/waze-is-banned-in-germany-not-really/, 2 pages (Year: 2020).*

(Continued)

*Primary Examiner* — Yongjia Pan
(74) *Attorney, Agent, or Firm* — Kubota & Basol LLP

(57) ABSTRACT

In some embodiments, an electronic device displays user interfaces for viewing information about and/or for reporting information about incidents of different types associated with a (e.g., physical) location.

33 Claims, 27 Drawing Sheets

(56) References Cited

U.S. PATENT DOCUMENTS

| | | | |
|---|---|---|---|
| 8,358,222 B2* | 1/2013 | Gueziec | G08G 1/0967 340/905 |
| 8,381,135 B2 | 2/2013 | Hotelling et al. | |
| 8,479,122 B2 | 7/2013 | Hotelling et al. | |
| 8,698,622 B1* | 4/2014 | Emigh | G06F 3/04842 340/539.13 |
| 8,718,910 B2* | 5/2014 | Gueziec | G08G 1/0112 701/119 |
| 9,348,458 B2 | 5/2016 | Hotelling et al. | |
| 9,933,937 B2 | 4/2018 | Lemay et al. | |
| 10,024,684 B2* | 7/2018 | Wang | G01C 21/3691 |
| 11,060,882 B2* | 7/2021 | Di Pietro | G06N 20/00 |
| 2002/0015024 A1 | 2/2002 | Westerman et al. | |
| 2005/0052462 A1* | 3/2005 | Sakamoto | G01C 21/3694 345/473 |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2008/0255754 A1* | 10/2008 | Pinto | G08G 1/096844 701/119 |
| 2011/0043377 A1* | 2/2011 | McGrath | G08G 1/096775 340/905 |
| 2011/0175751 A1* | 7/2011 | Khachaturian | G01C 21/3697 340/905 |
| 2011/0181443 A1 | 7/2011 | Gutierrez et al. | |
| 2013/0173155 A1* | 7/2013 | Fino | G01C 21/36 701/533 |
| 2014/0336933 A1* | 11/2014 | Moribe | G08G 1/096791 701/538 |
| 2015/0032366 A1* | 1/2015 | Man | H04W 4/024 701/412 |
| 2016/0088436 A1 | 3/2016 | Goss et al. | |
| 2017/0205242 A1 | 7/2017 | Schmidt et al. | |

FOREIGN PATENT DOCUMENTS

| | | | |
|---|---|---|---|
| EP | 3554103 A1 * | 10/2019 | G01C 21/3629 |
| KR | 20060118750 A * | 11/2006 | |
| WO | WO-2009080073 A1 * | 7/2009 | G08G 1/20 |
| WO | WO-2010105712 A1 * | 9/2010 | G09B 29/10 |
| WO | 2013/169849 A2 | 11/2013 | |
| WO | 2014/105276 A1 | 7/2014 | |
| WO | 2020/161706 A1 | 8/2020 | |

OTHER PUBLICATIONS

Update or cancel reports, May 23, 2013, URL—https://www.waze.com/forum/viewtopic.php?p=444568, 4 pages (Year: 2013).*

Waze Found a Way to Make Traffic Easy, Apr. 15, 2014, URL—https://web.archive.org/web/20150621070103/https://edisonawards.com/news/waze-found-a-way-to-make-traffic-easy/, 2 pages (Year: 2014).*

Dan Katcher, How do I love thee? Let me count the Waze, Feb. 13, 2015, https://web.archive.org/web/20170112215436/https://www.rocketfarmstudios.com/blog/how-i-love-thee-let-me-count-waze/, 14 pages (Year: 2015).*

How to Adjust Your Alerts on Waze, Sep. 10, 2018, URL—https://www.wikihow.com/Adjust-Your-Alerts-on-Waze, 5 pages (Year: 2018).*

Edward Ling, Let's reduce accidents together, May 25, 2017, URL—https://www.linkedin.com/pulse/lets-reduce-accidents-together-edward-ling, 9 pages (Year: 2017).*

William C. Vantuono, Grade crossing safety: The "Waze" of the future, Jun. 12, 2018, URL—https://www.railwayage.com/news/grade-crossing-safety-the-waze-of-the-future/, 1 page (Year: 2018).*

Darrell Etherington, Waze adds unplowed road reporting feature for better awareness of winter driving hazards, Dec. 10, 2019, URL—https://techcrunch.com/2019/12/10/waze-adds-unplowed-road-reporting-feature-for-better-awareness-of-winter-driving-hazards/, 1 page (Year: 2019).*

[General Question] What's the number by reports mean?, Dec. 19, 2018, URL—https://www.reddit.com/r/waze/comments/a7o8er/general_question_whats_the_number_by_reports_mean/, 1 page (Year: 2018).*

When a Waze user reports a hazard, how do you confirm it?, 2018, URL—https://www.quora.com/When-a-Waze-user-reports-a-hazard-how-do-you-confirm-it, 5 pages (Year: 2018).*

Questions and popups while driving, Jun. 18, 2013, URL—https://www.waze.com/forum/viewtopic.php?f=657&t=52499, 6 pages (Year: 2013).*

Time Limit for Reports, Oct. 13, 2018, URL—https://www.waze.com/forum/viewtopic.php?p=1878974, 4 pages (Year: 2018).*

International Search Report received for PCT Patent Application No. PCT/US2021/032985, dated Sep. 15, 2021, 5 pages.

* cited by examiner

700

702 — Display, via a display generation component, a map user interface including a representation of a map, wherein the representation of the map includes a respective location associated with a respective temporary characteristic 704 — In accordance with a determination that the respective temporary characteristic is of a first type, the representation of the map includes a visual indication of the respective temporary characteristic displayed at the respective location on the representation of the map 706 — In accordance with a determination that the respective temporary characteristic is of a second type, different from the first type, the representation of the map does not include a visual indication of the respective temporary characteristic displayed at the respective location on the representation of the map

FIG. 7

USER INTERFACES FOR REPORTING INCIDENTS

CROSS-REFERENCE TO RELATED APPLICATION

This application claims the benefit of U.S. Provisional Application No. 63/026,640, filed May 18, 2020, the content of which is hereby incorporated by reference in its entirety for all purposes.

FIELD OF THE DISCLOSURE

This specification relates generally to electronic devices that display user interfaces for reporting incidents.

BACKGROUND

User interaction with electronic devices has increased significantly in recent years. These devices can be devices such as computers, tablet computers, televisions, multimedia devices, mobile devices, and the like.

In some circumstances, users wish to view and/or report information about incidents associated with a (e.g., physical) location, for example using a maps application. An electronic device can provide a user with user interfaces for performing such actions associated with a location.

SUMMARY

Some embodiments described in this disclosure are directed to user interfaces for viewing information about and/or reporting information about different types of incidents using, for example, a maps application. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 7 is a flow diagram illustrating a method for displaying and/or reporting incident information on an electronic device in accordance with some embodiments.

DETAILED DESCRIPTION

Figure 1A:
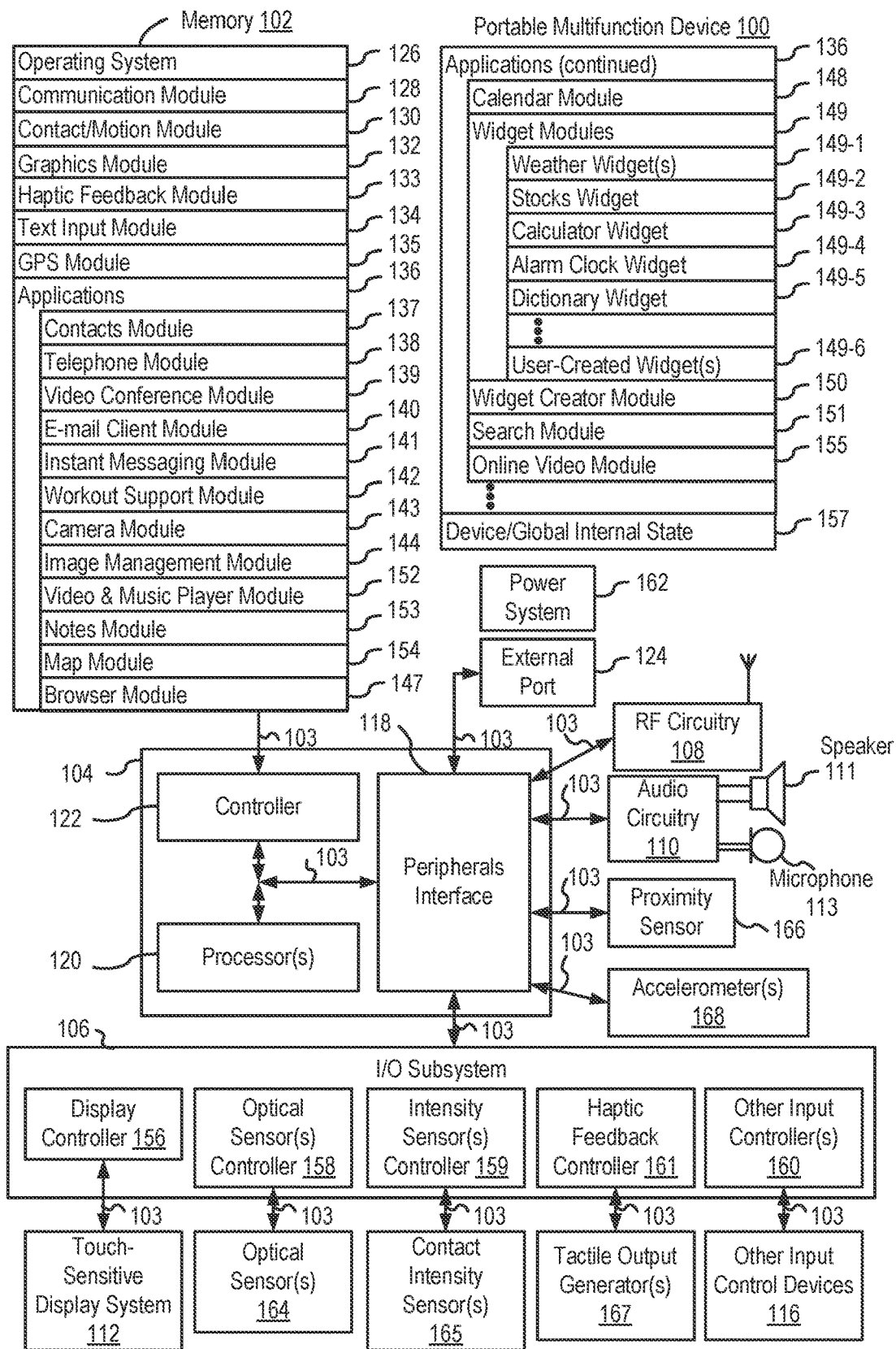
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient user interfaces and mechanisms for user interaction for viewing information about and/or reporting information about incidents of different types associated with a (e.g., physical) location. In some implementations, an electronic device displays indications of non-sensitive incidents (e.g., hazards and/or accidents) at the locations of such incidents on a map. In some implementations, an electronic device does not display indications of the existence of sensitive incidents, such as the existence of personnel (e.g., police, fire, etc.), at the locations of such sensitive incidents on a map (e.g., to protect the privacy and/or security of such sensitive incidents). In some implementations, an electronic device does display indications of approximate distances of sensitive incidents from the electronic device. Such techniques can reduce the cognitive burden on a user who uses such devices and/or protect the privacy and/or security of sensitive incidents while continuing to effectively alert the user of the presence of such sensitive incidents. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
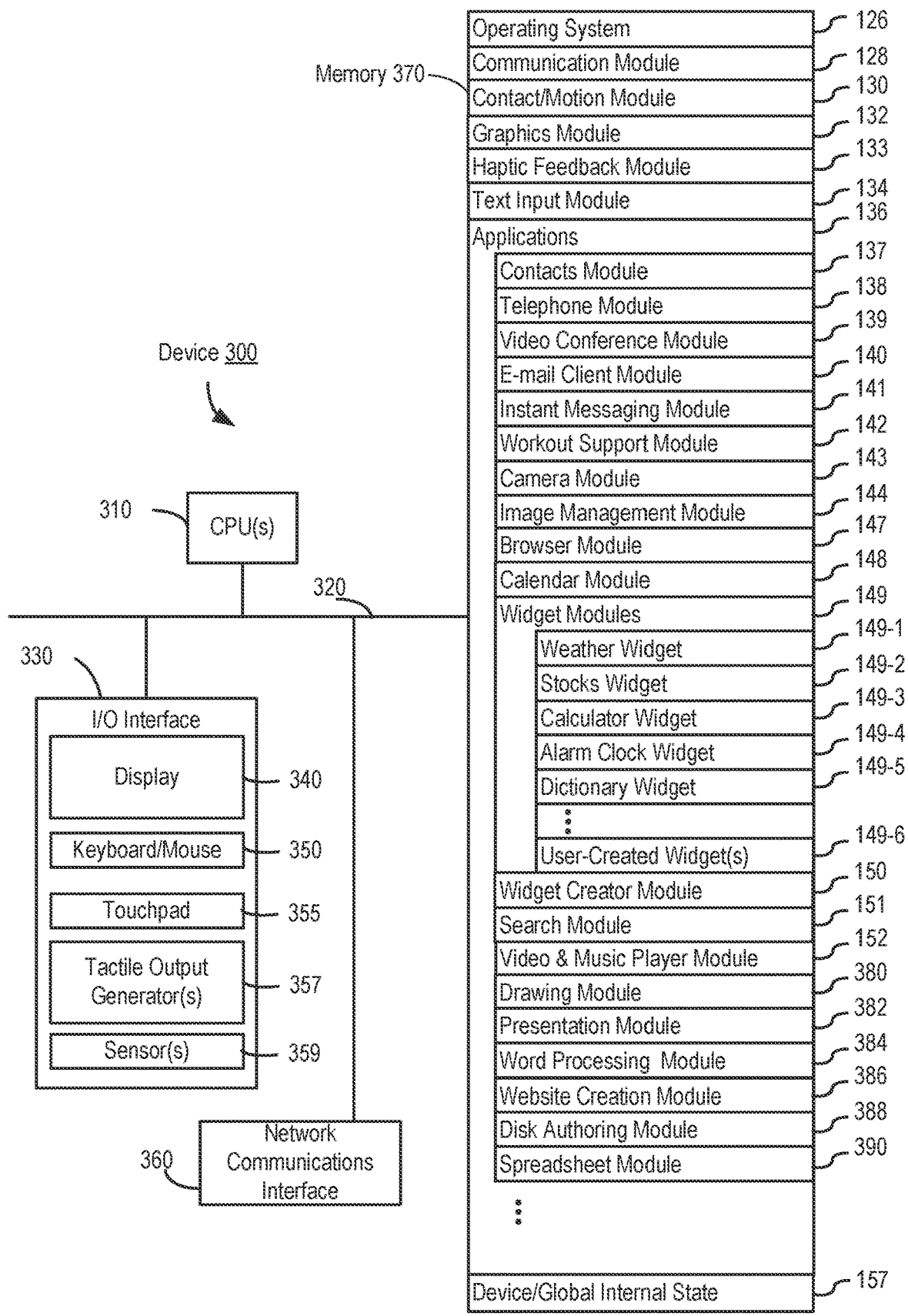
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
 Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;
 Video player module;
 Music player module;
 Browser module 147;
 Calendar module 148;
 Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 Widget creator module 150 for making user-created widgets 149-6;
 Search module 151;
 Video and music player module 152, which merges video player module and music player module;
 Notes module 153;
 Map module 154; and/or
 Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
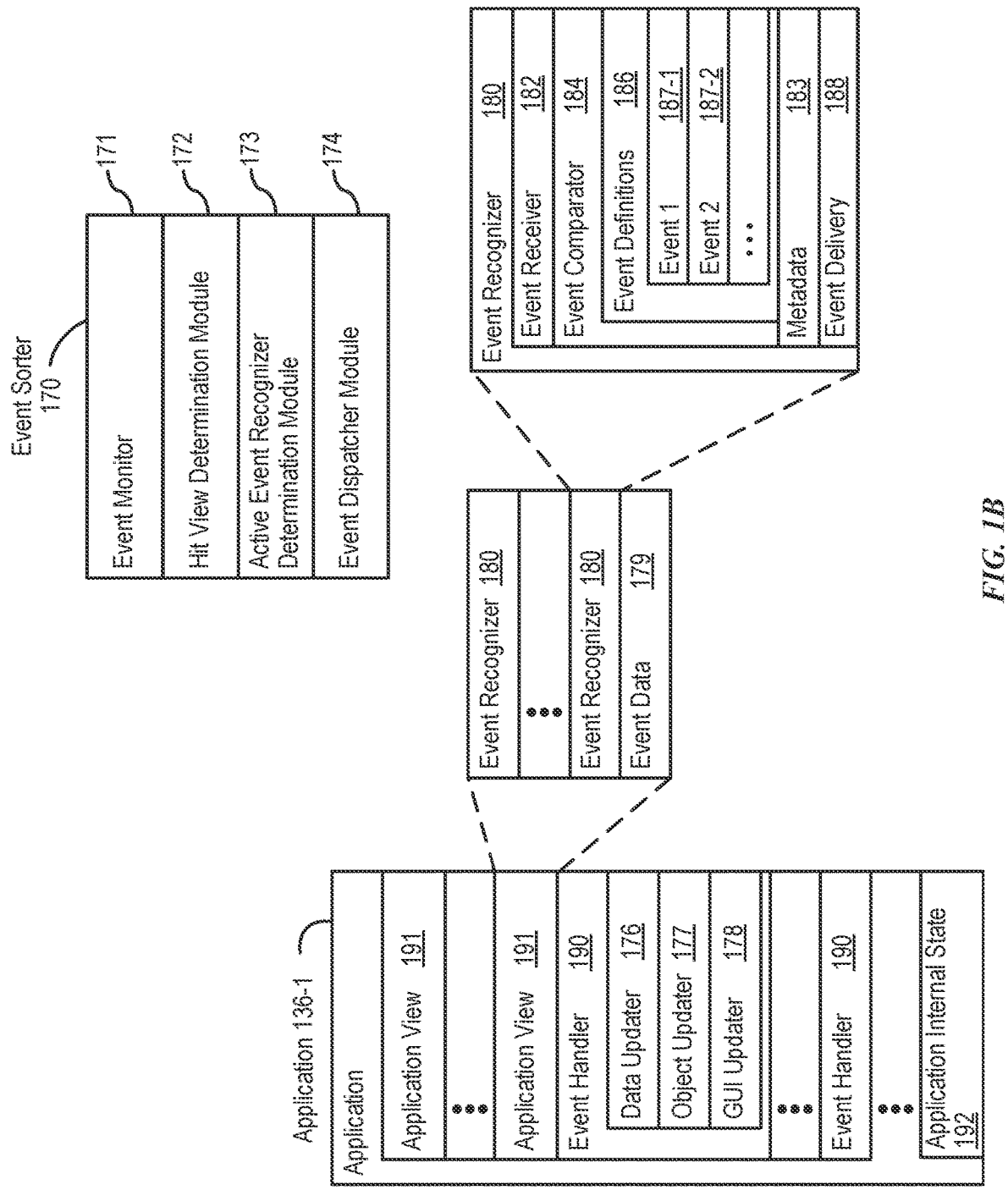
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
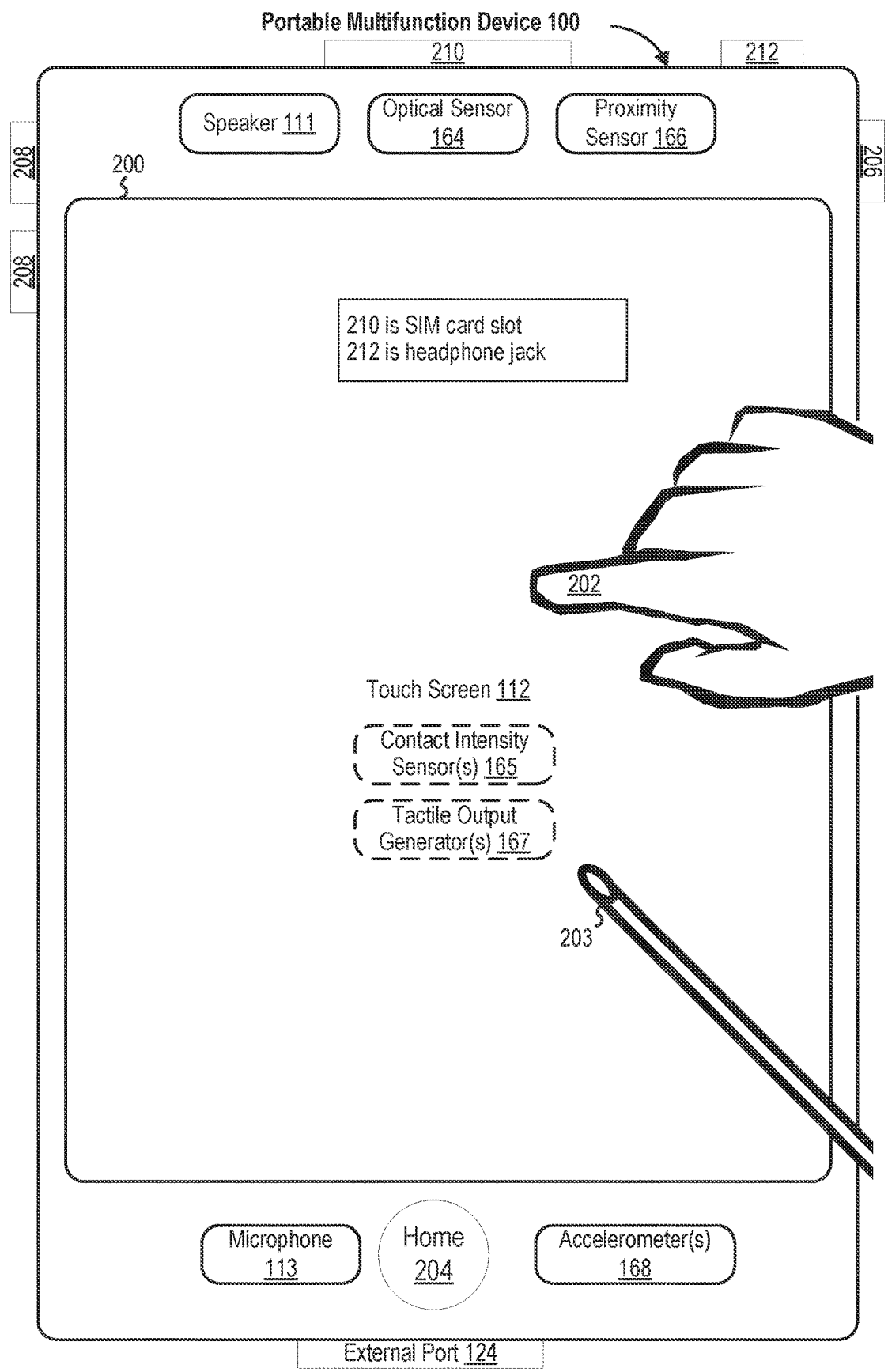
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
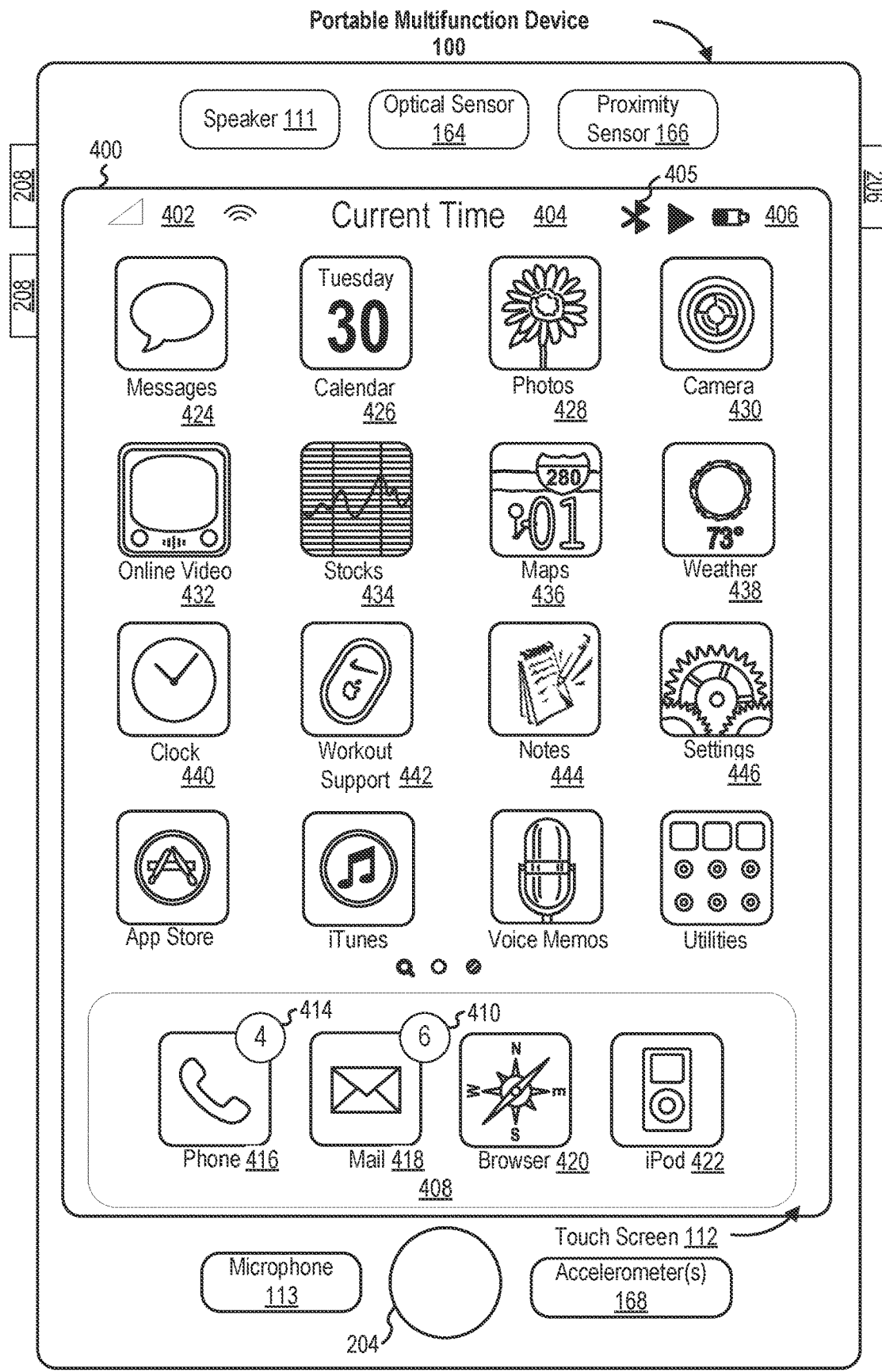
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
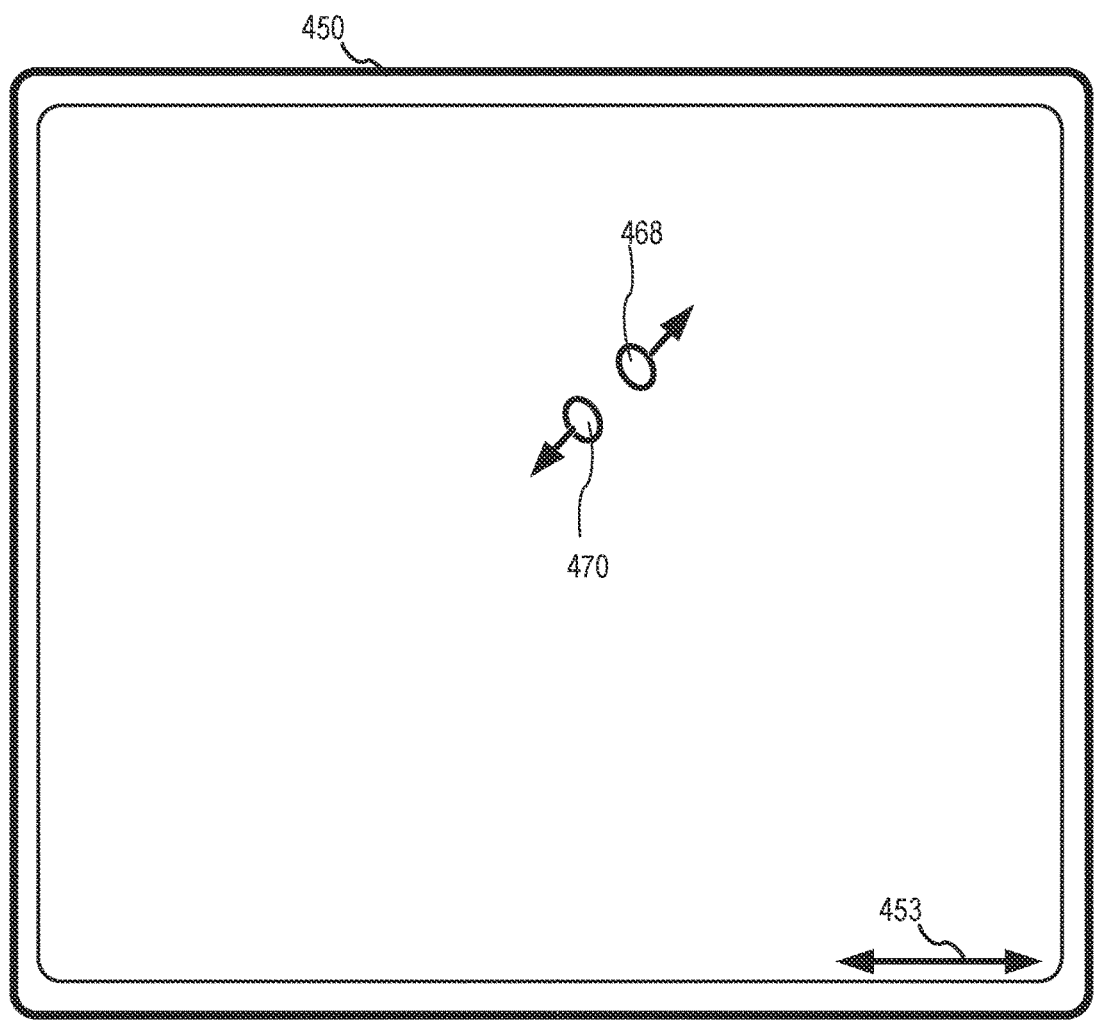
FIG. 4B illustrates an exemplary user interface for a multifunction device with a touch-sensitive surface that is separate from the display in accordance with some embodiments.
Figure 4B:
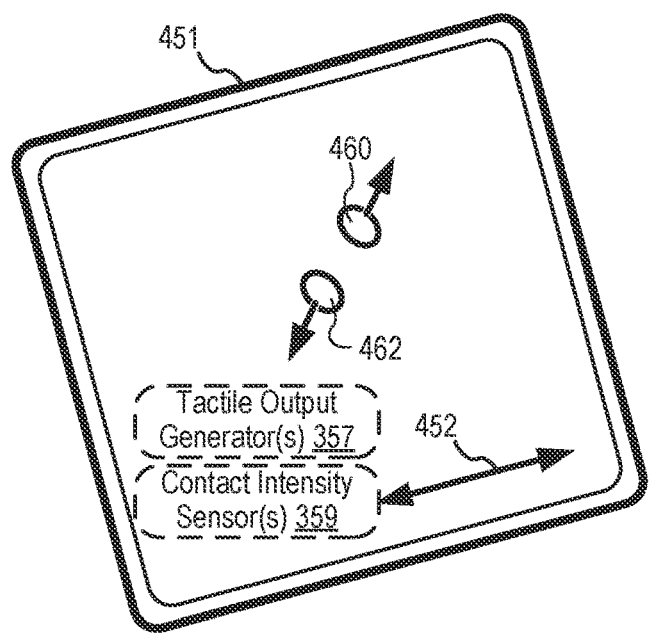

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to location 468 and contact 462 corresponds to location 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
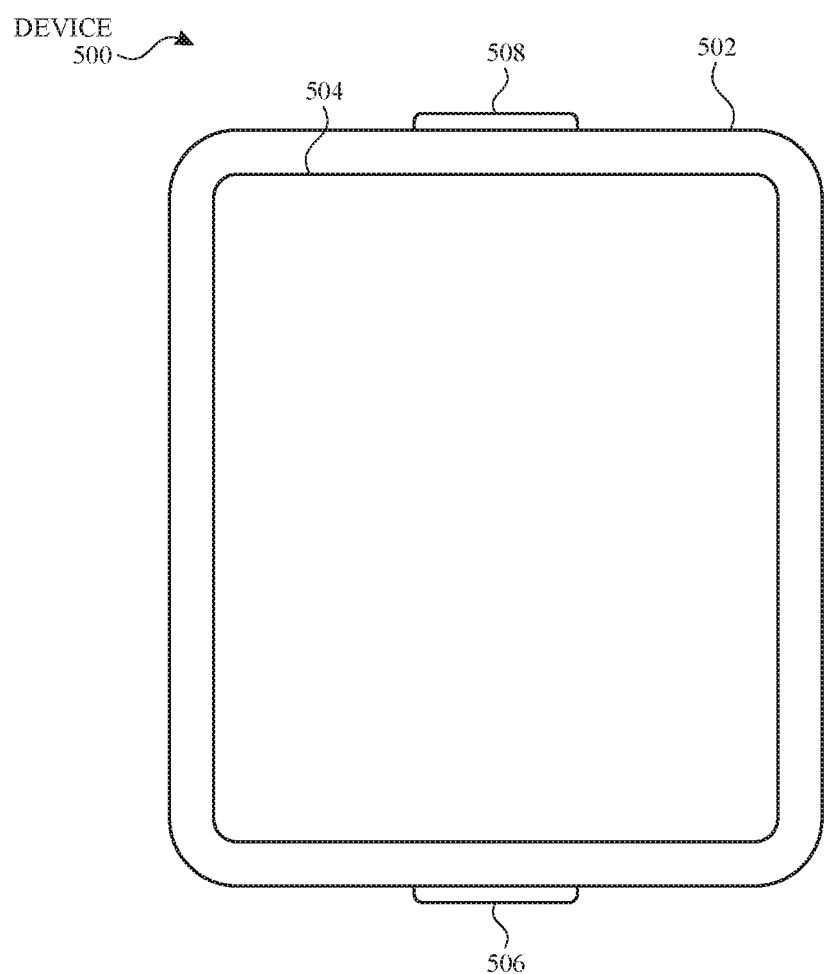
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
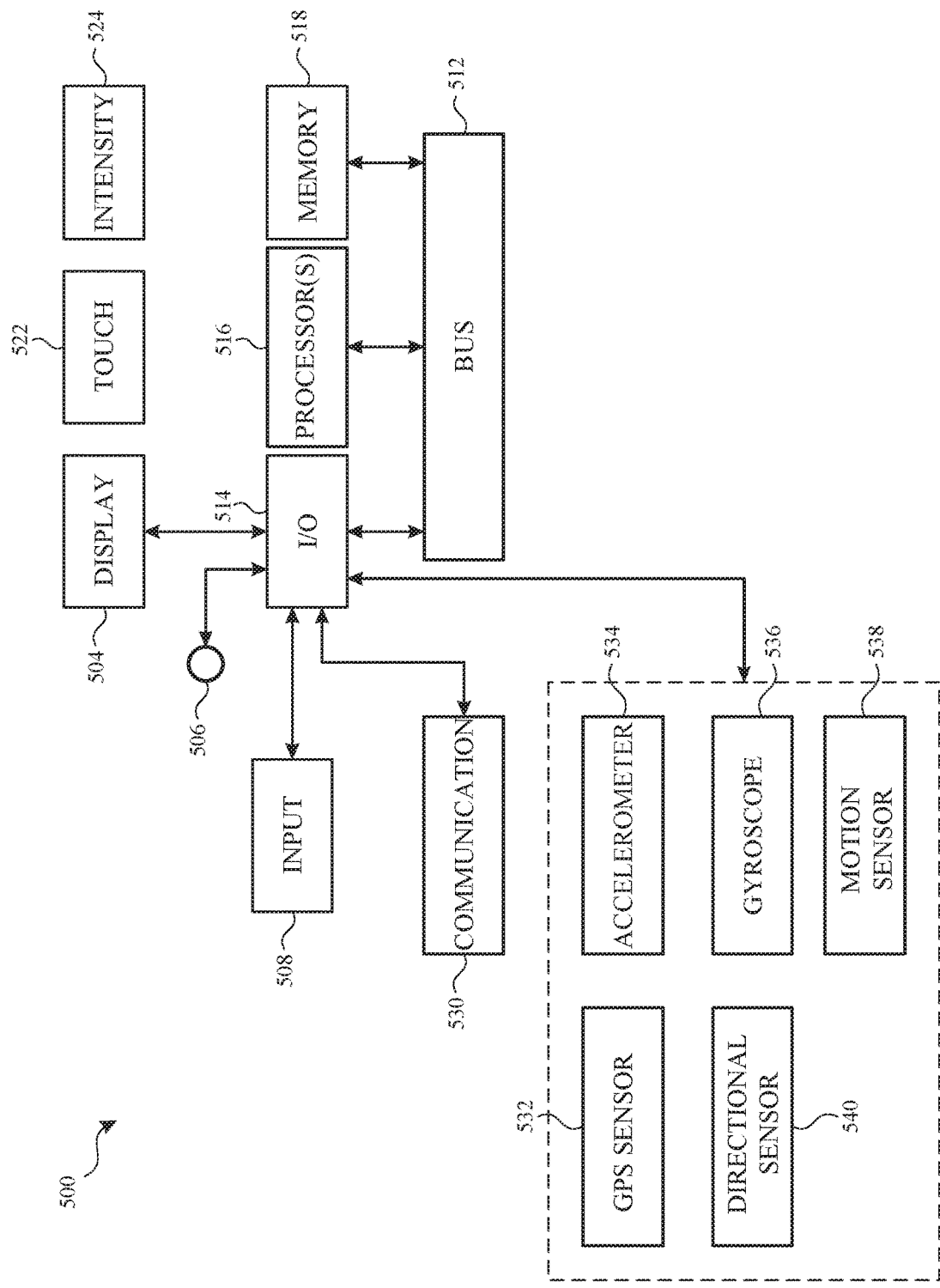
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
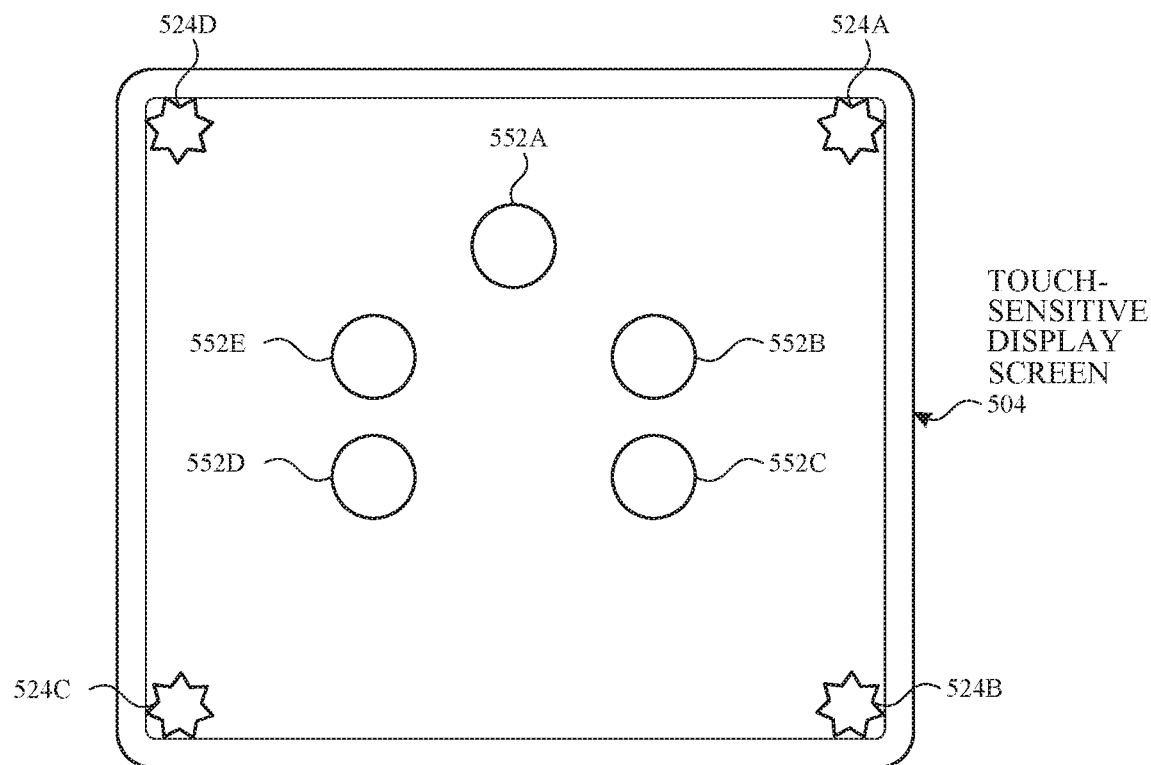
FIGS. 5C-5D illustrate exemplary components of a personal electronic device having a touch-sensitive display and intensity sensors in accordance with some embodiments.
Figure 5C:
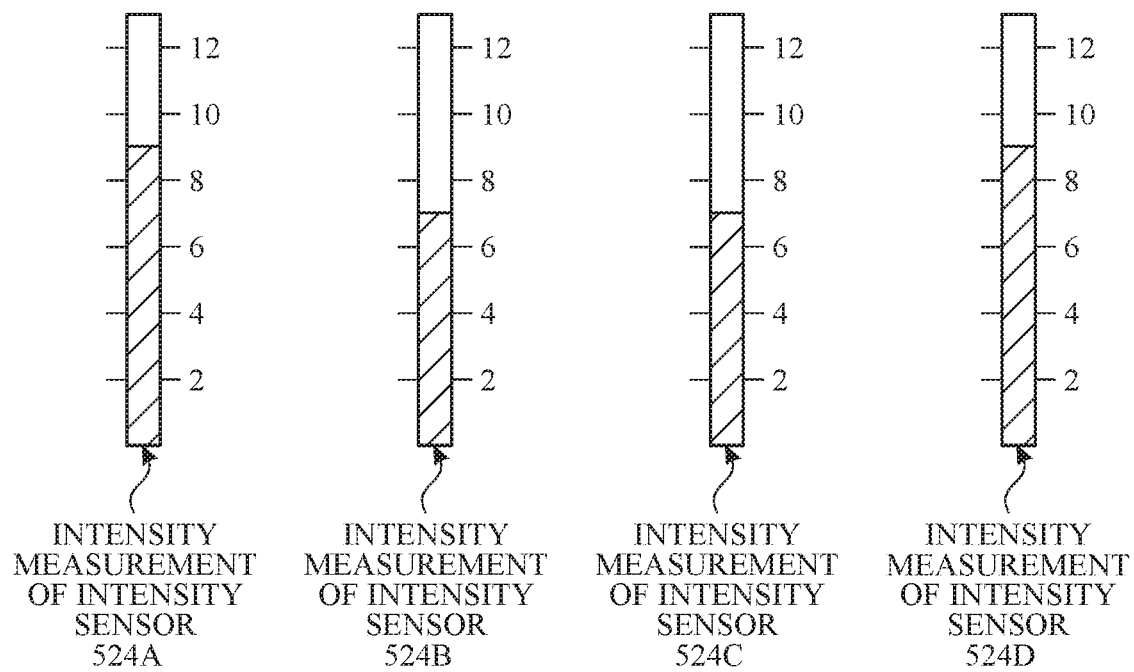
Figure 5D:
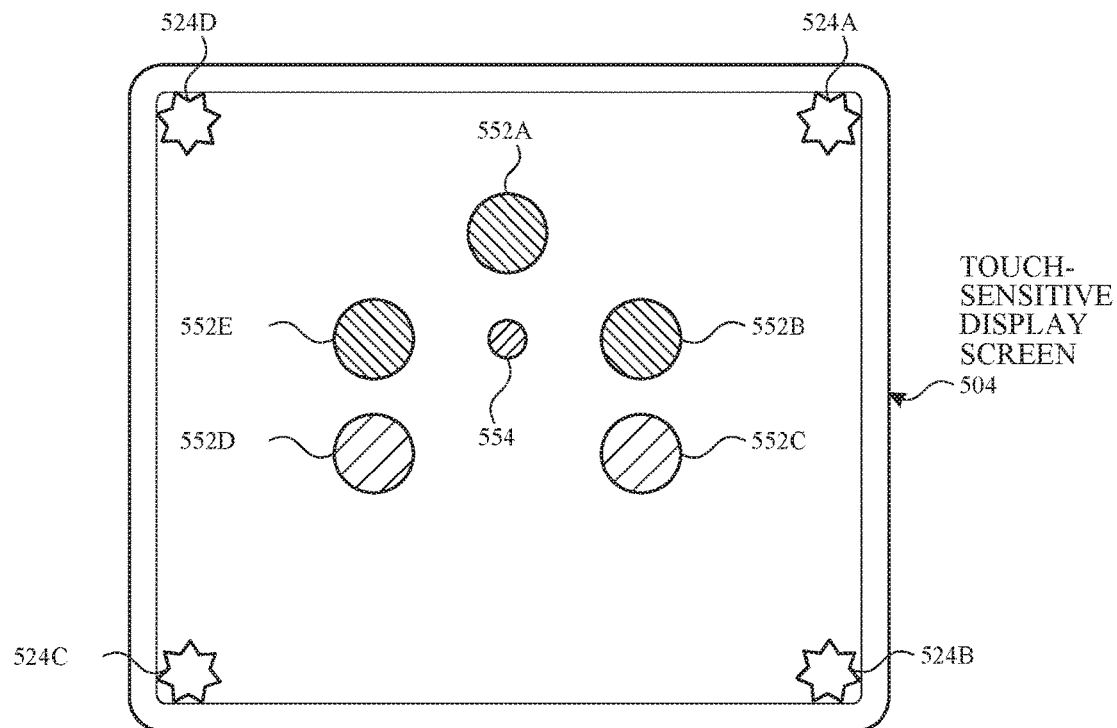
Figure 5D:
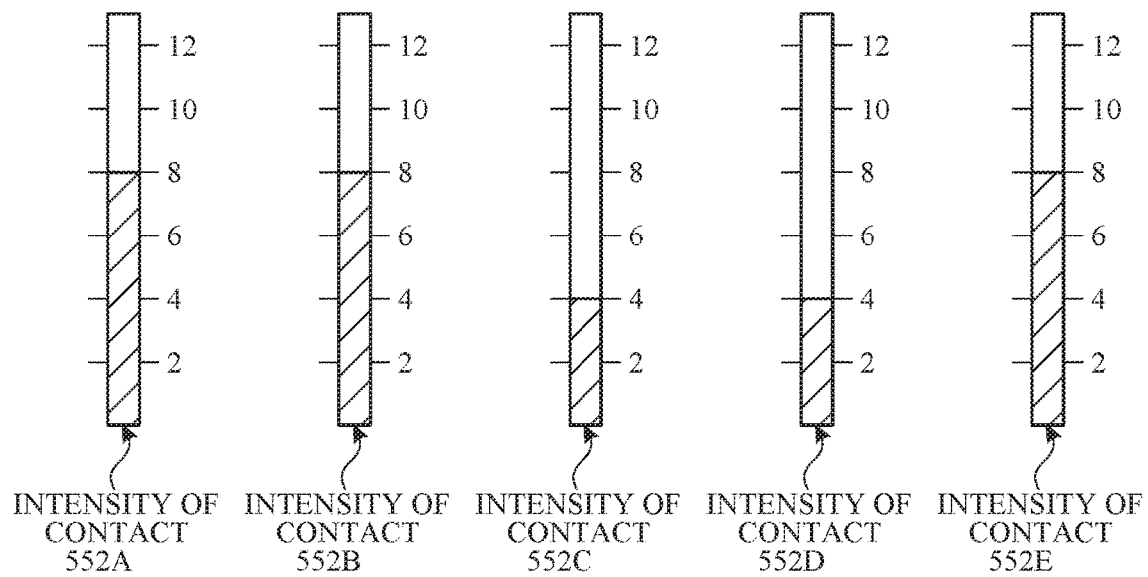

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
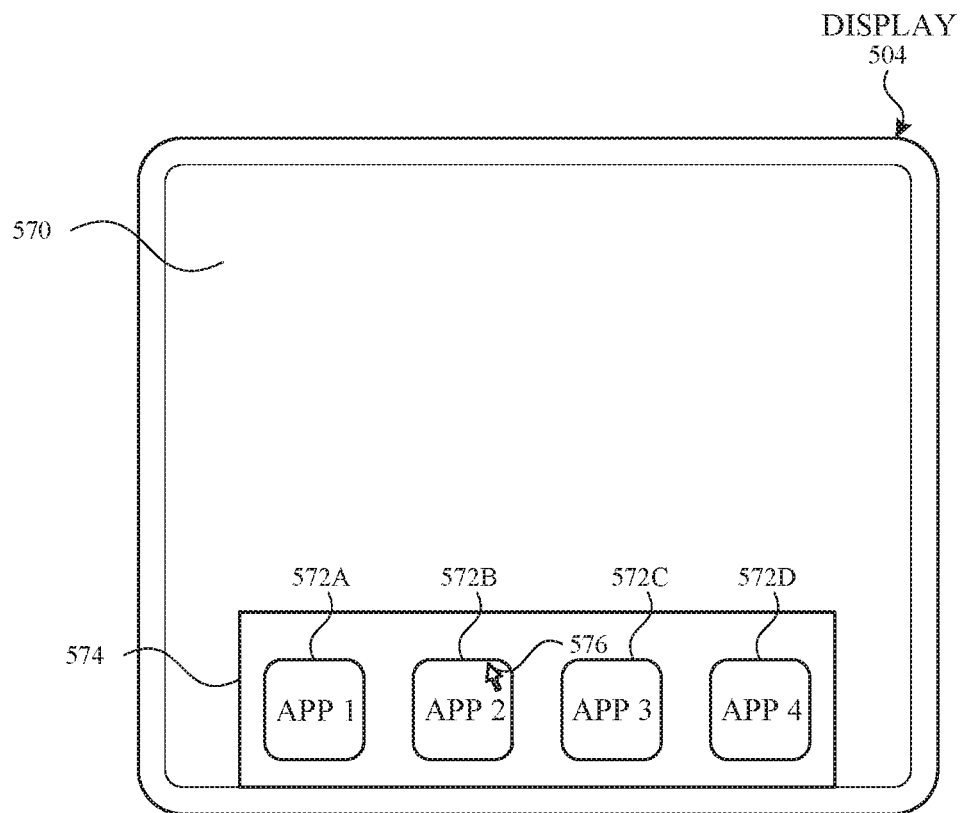
FIGS. 5E-5H illustrate exemplary components and user interfaces of a personal electronic device in accordance with some embodiments.
Figure 5E:
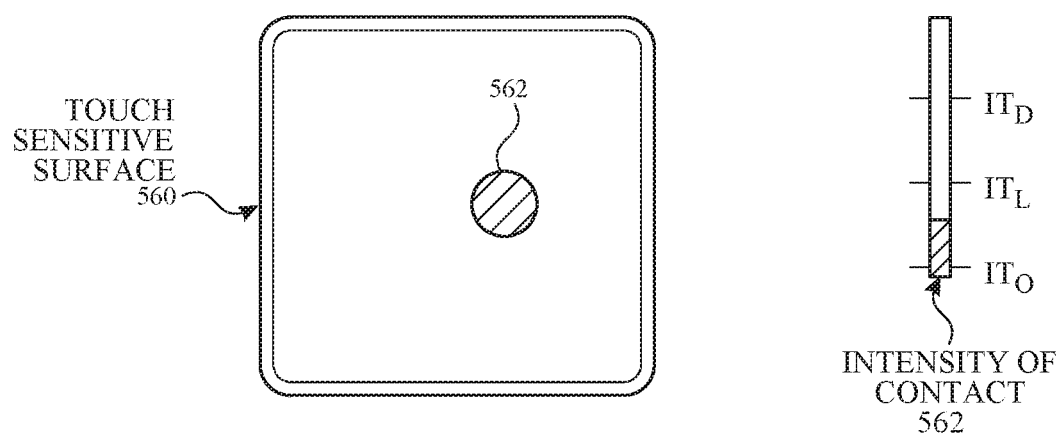
Figure 5F:
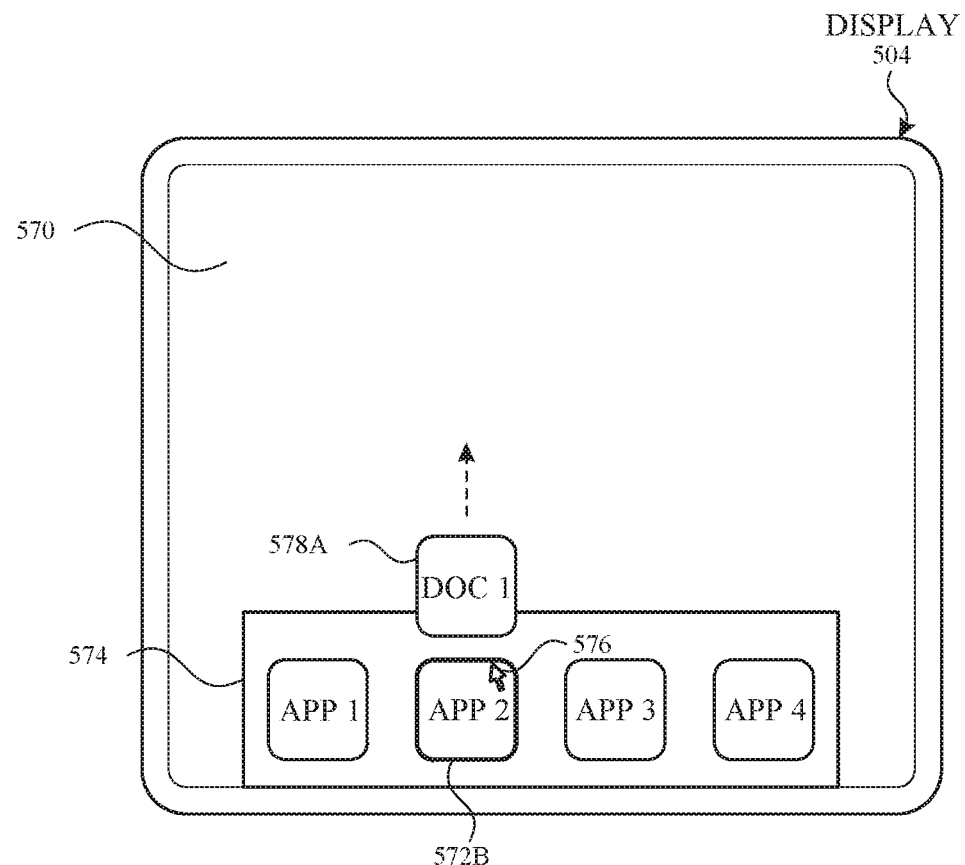
Figure 5F:
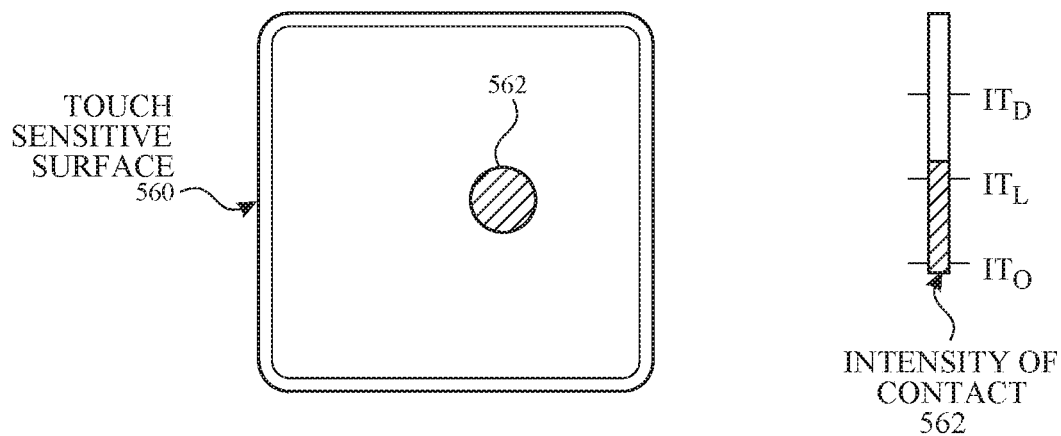
Figure 5G:
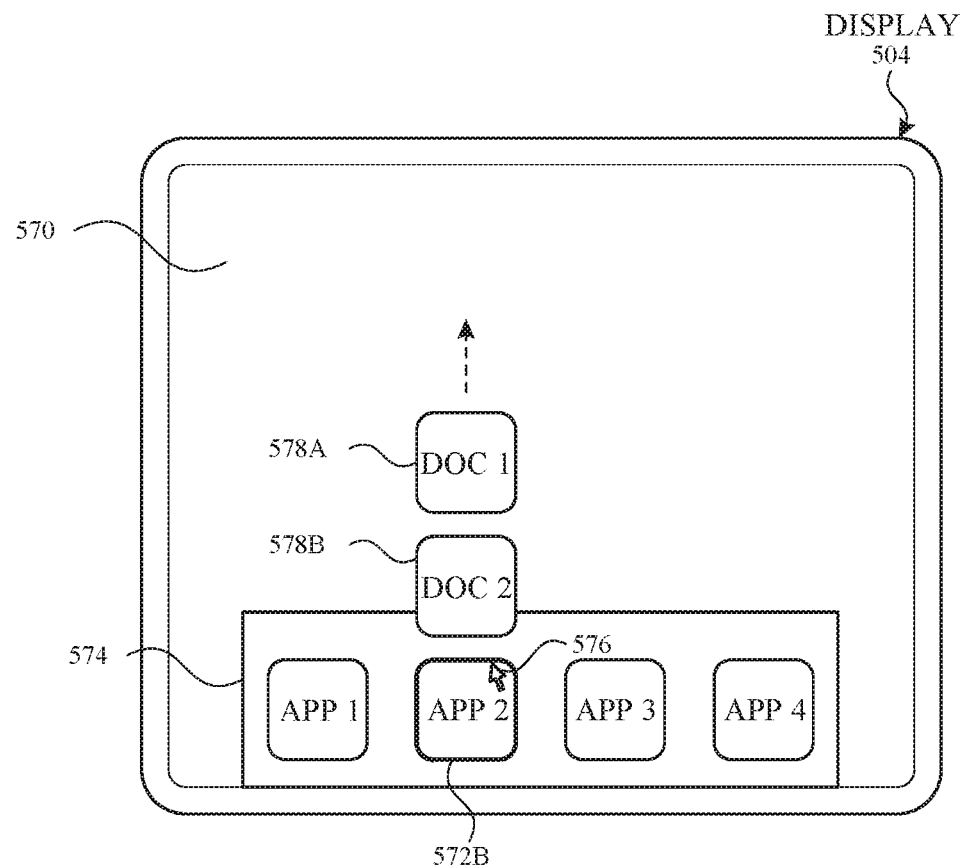
Figure 5G:
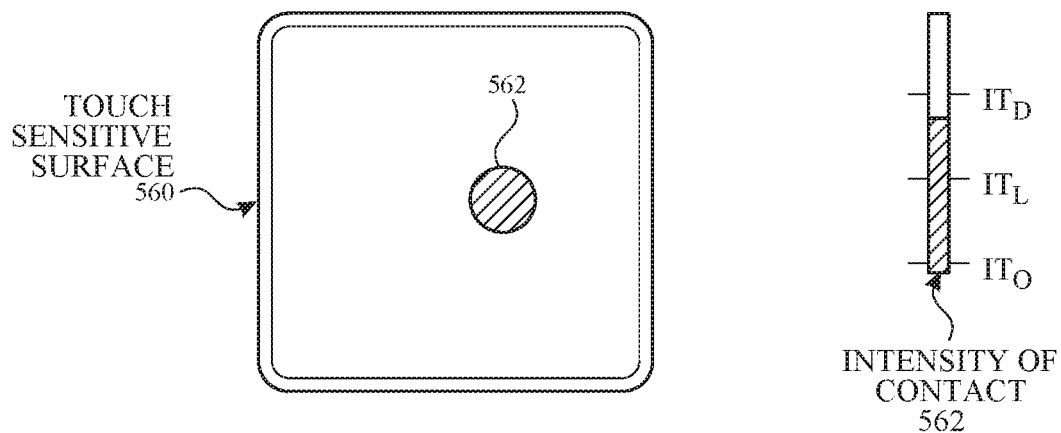
Figure 5H:
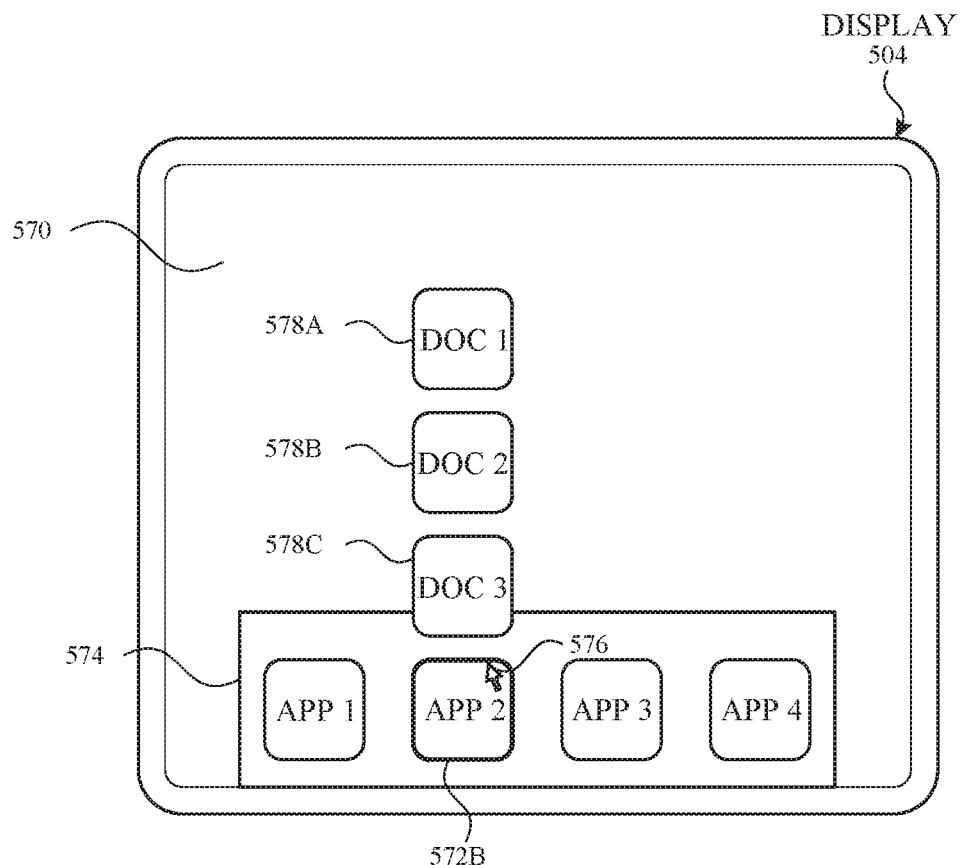
Figure 5H:
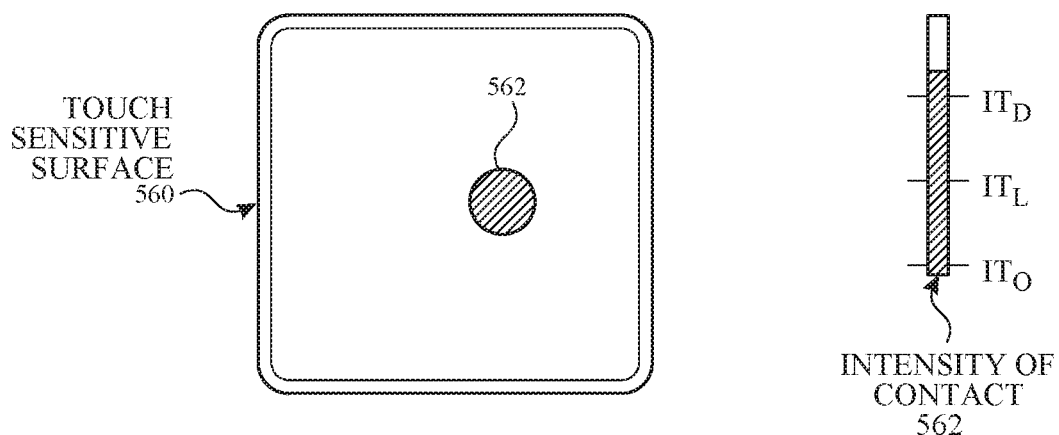

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as device 100, device 300, or device 500.

User Interfaces and Associated Processes

User Interfaces for Viewing and/or Reporting Incidents

Users interact with electronic devices in many different manners, including interacting with maps and maps applications for viewing information about various locations. In some embodiments, an electronic device displays a map in a map application, where the map includes representations of one or more particular locations (e.g., representations of the locations are located within a portion of the map that is currently displayed by the electronic device). In some circumstances, the particular locations may be locations at which incidents (e.g., accidents, hazards, emergency personnel) are present, and the user that is using the device may wish to report information about those incidents, e.g., to the maps application or a server associated with the maps application. In some circumstances, the particular locations may be locations at which incidents (e.g., accidents, hazards, emergency personnel) were previously reported by other users, and the user that is using the device may wish to receive appropriate information about those incidents and locations when viewing the map. The embodiments described below provide ways in which an electronic device provides efficient user interfaces for viewing and/or reporting incidents for one or more locations (e.g., on a map), thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
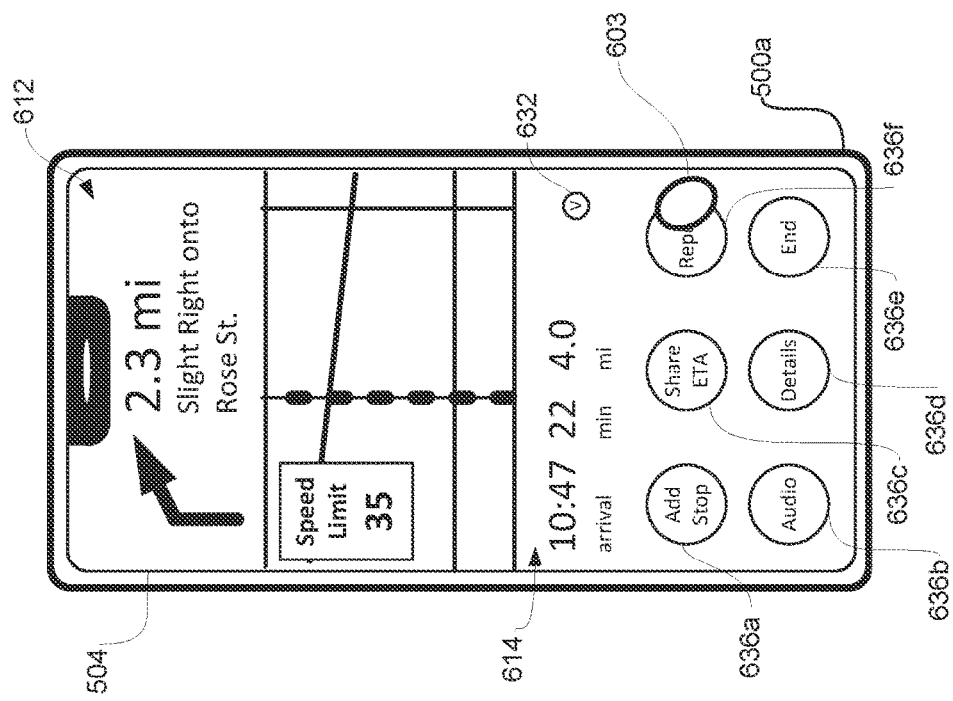
FIGS. 6A-6W illustrate exemplary ways in which an electronic device displays user interfaces for viewing and/or reporting information about incidents in accordance with some embodiments.
Figure 6A:
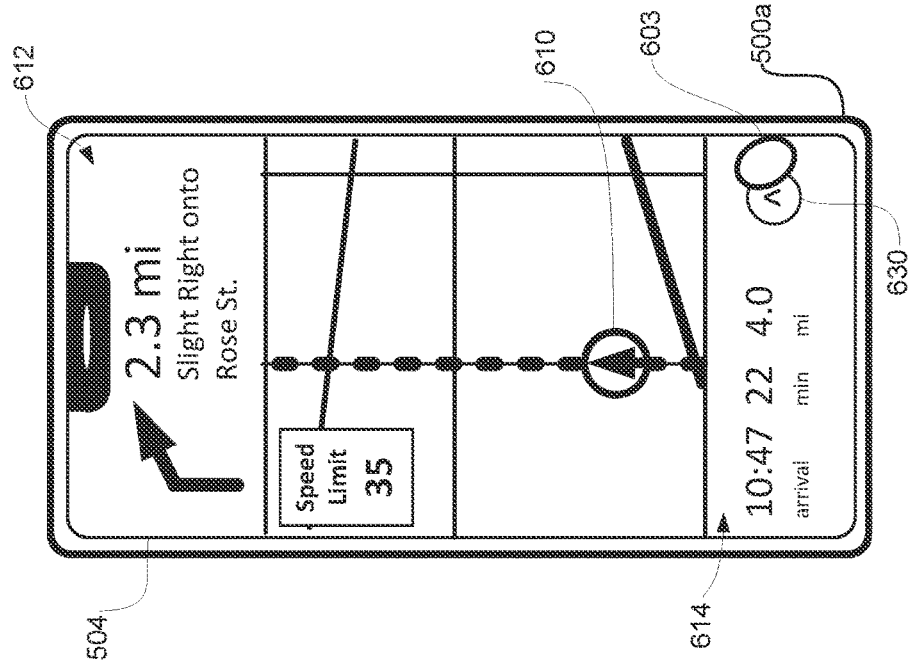
Figure 6D:
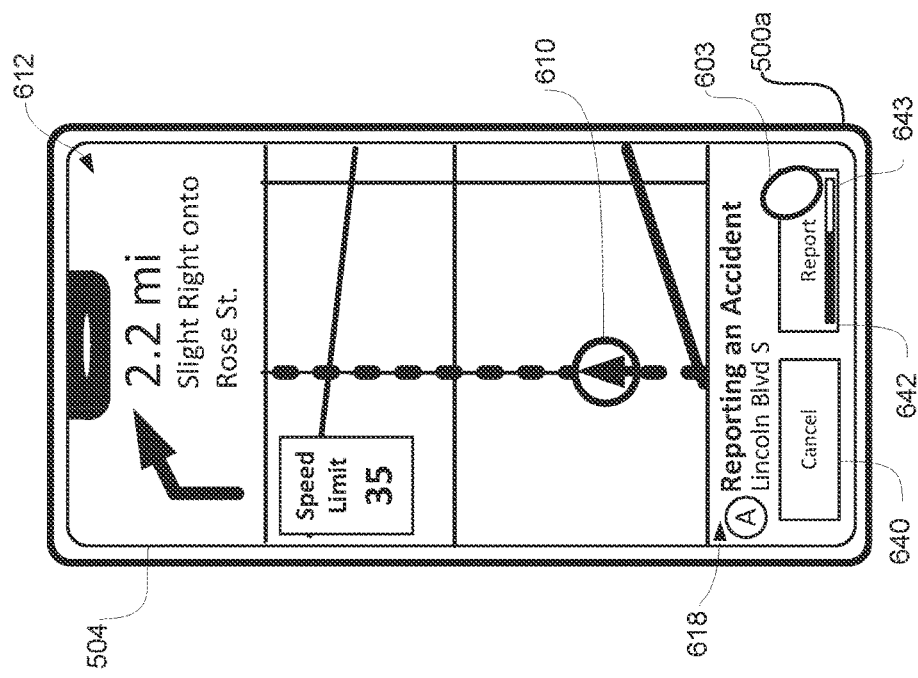
Figure 6C:
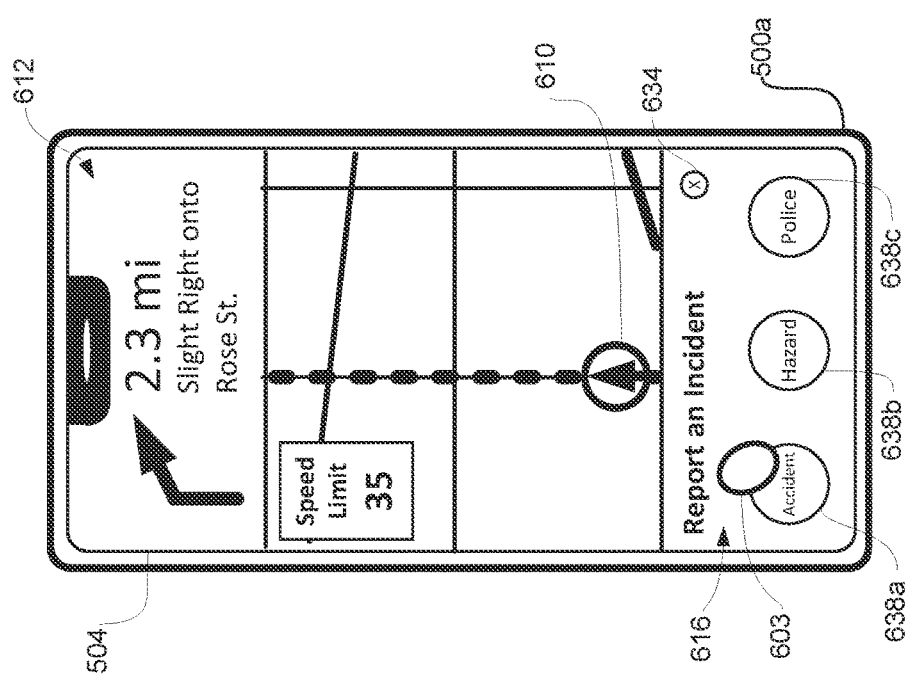
Figure 6F:
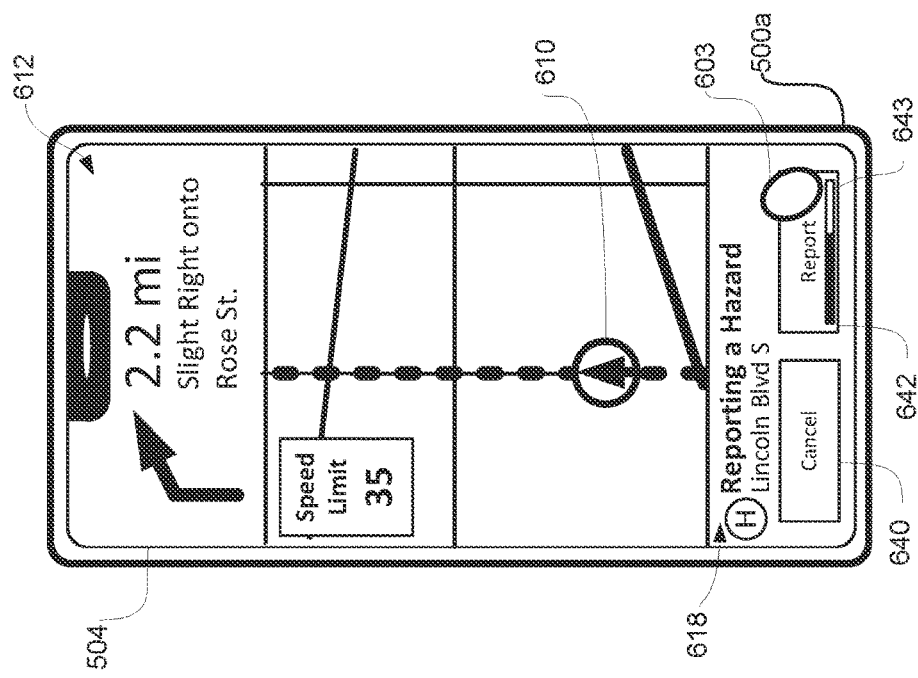
Figure 6E:
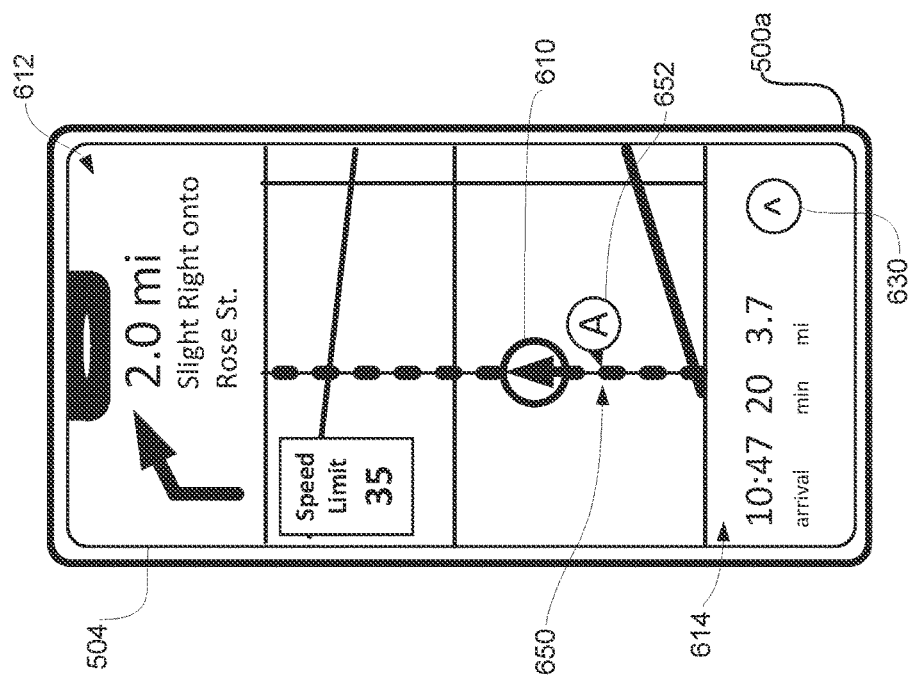
Figure 6H:
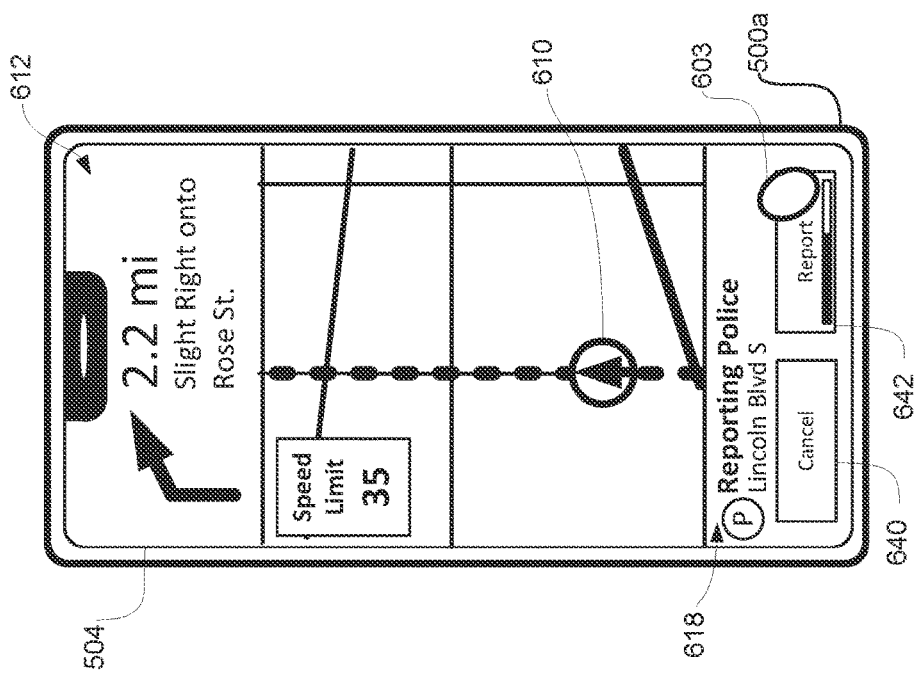
Figure 6G:
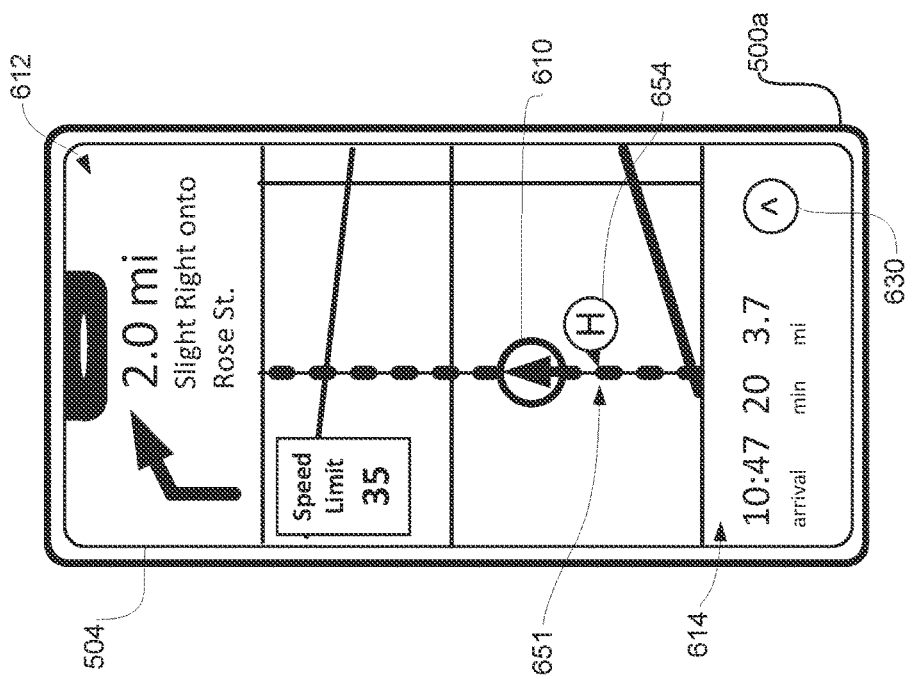
Figure 6J:
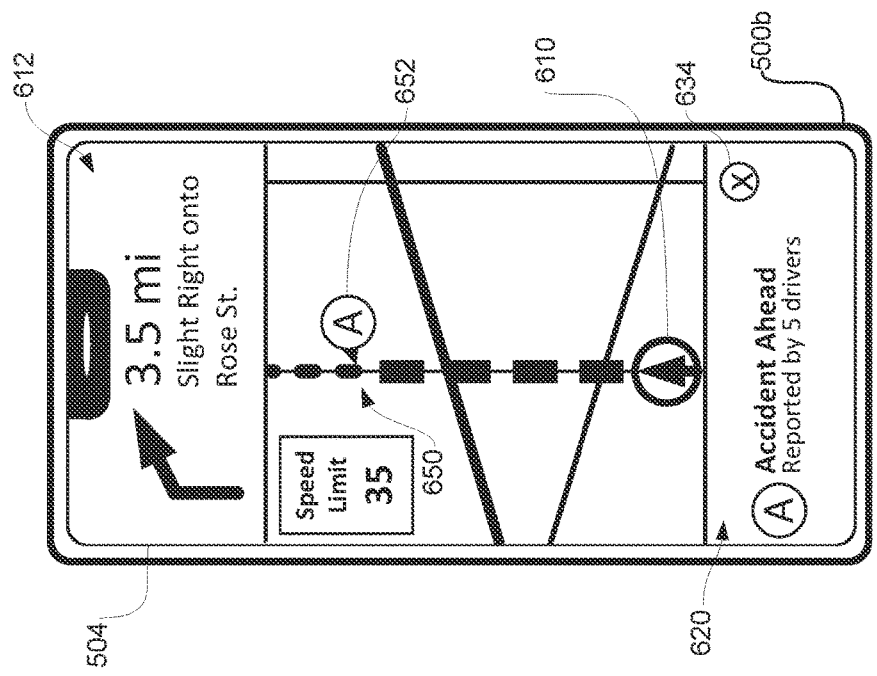
Figure 6I:
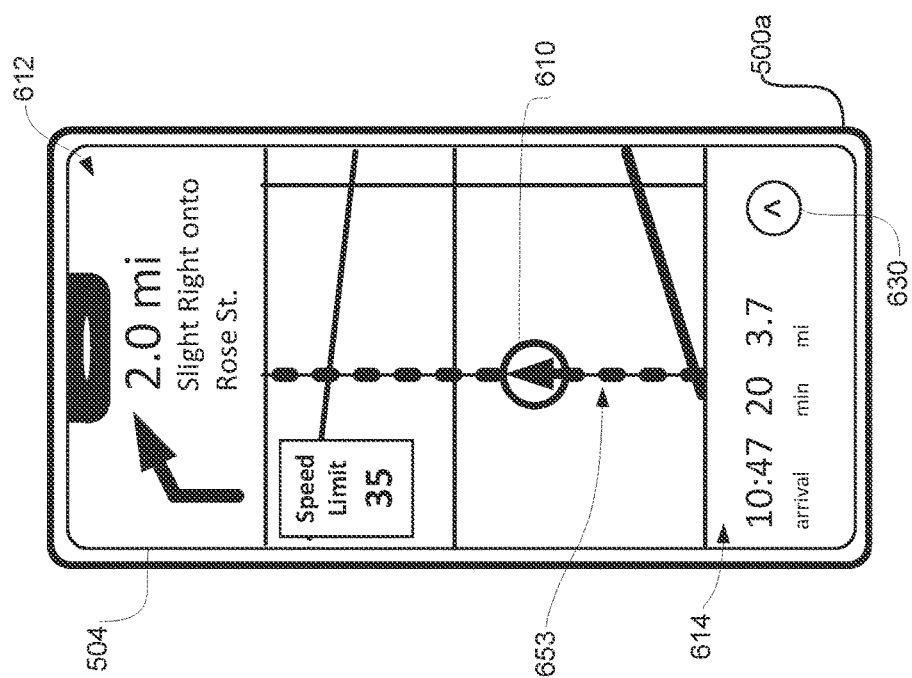
Figure 6L:
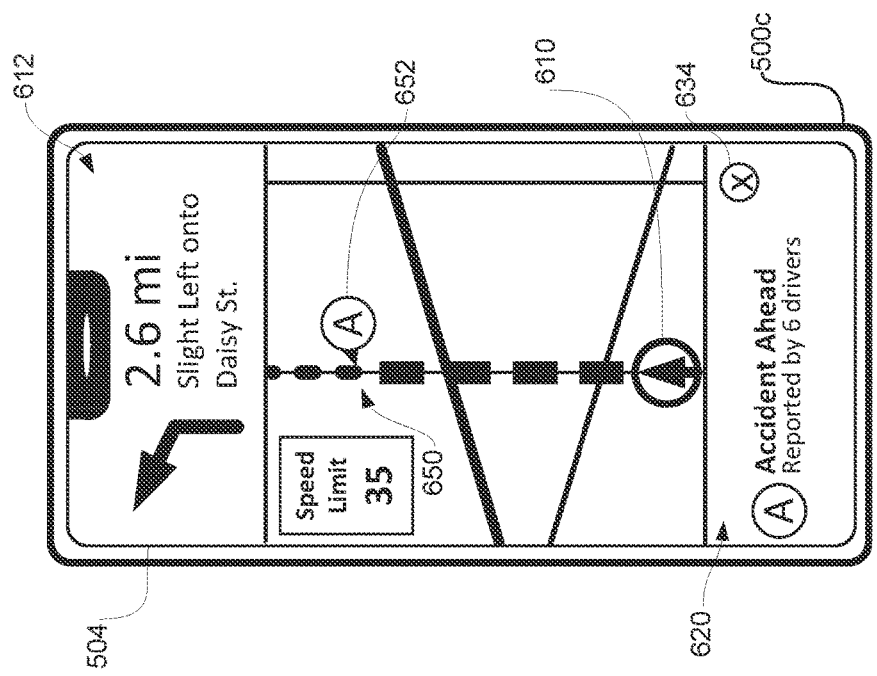
Figure 6K:
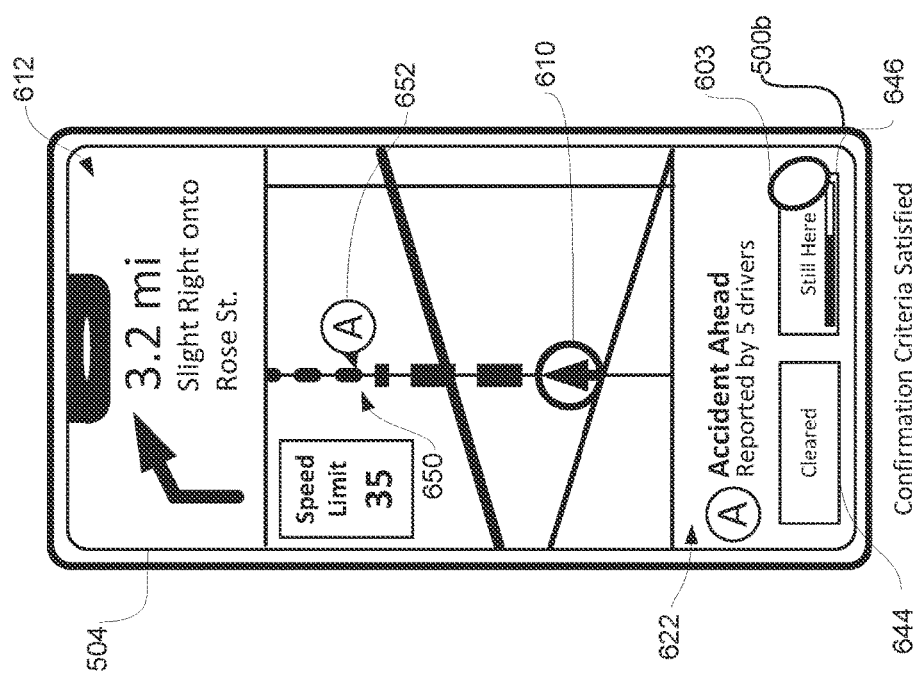
Figure 6N:
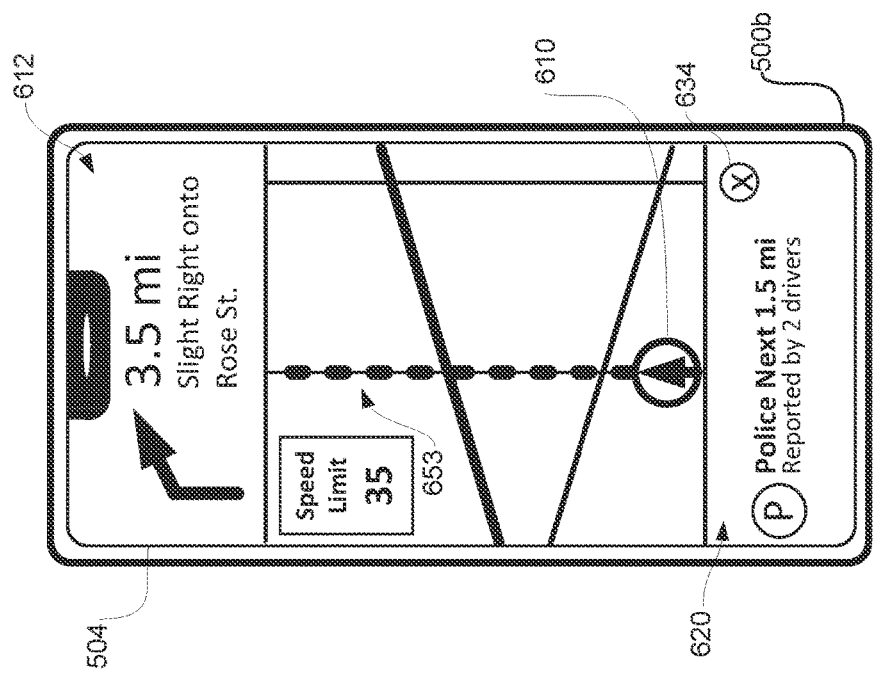
Figure 6M:
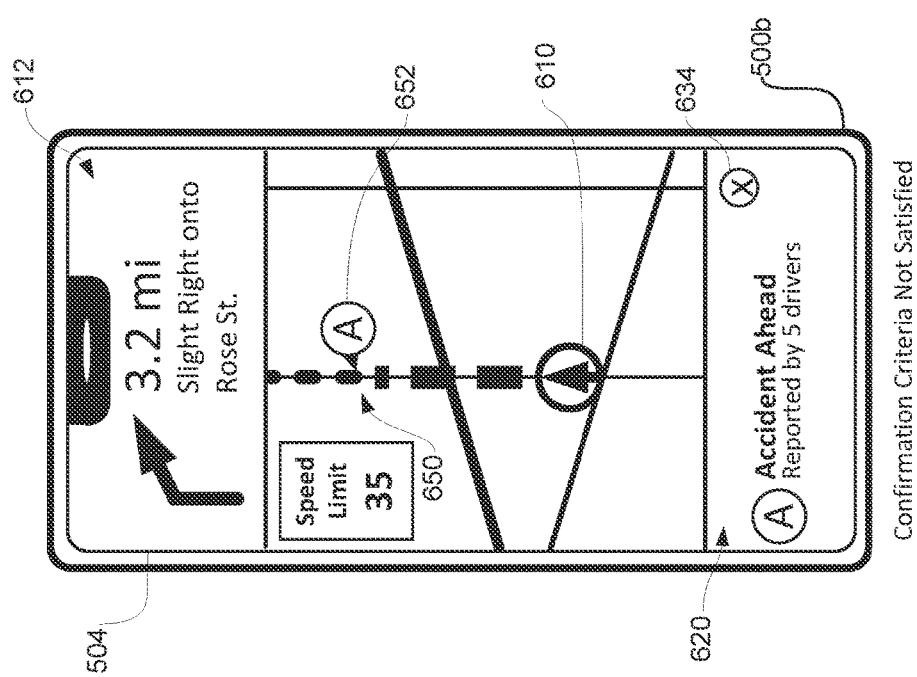
Figure 6P:
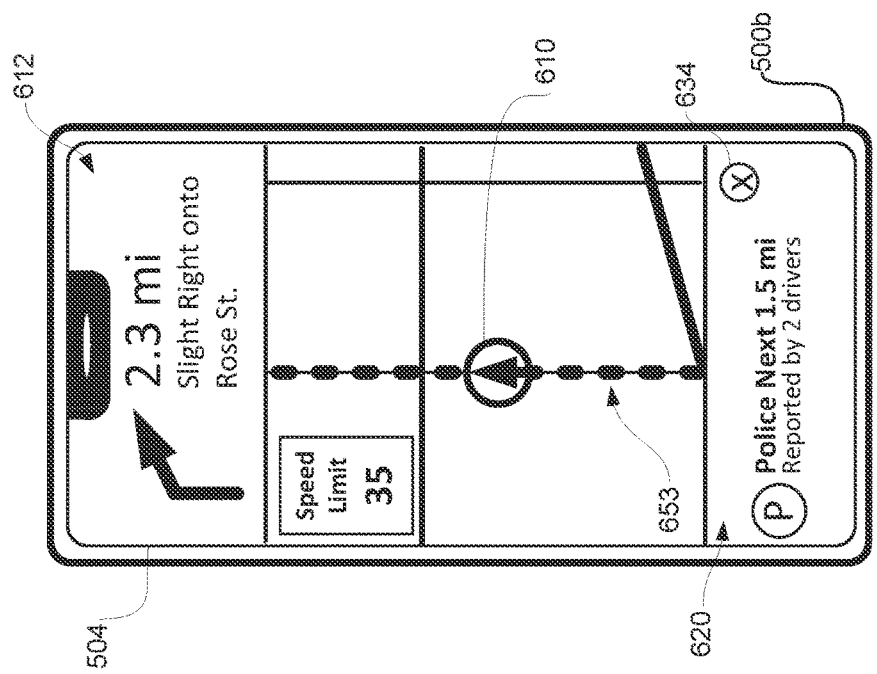
Figure 6O:
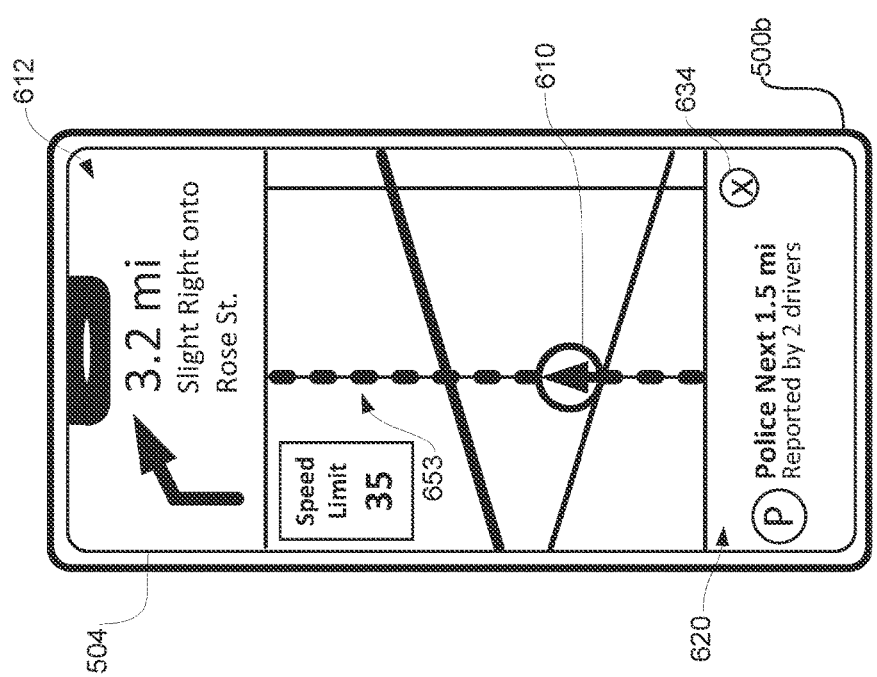
Figure 6R:
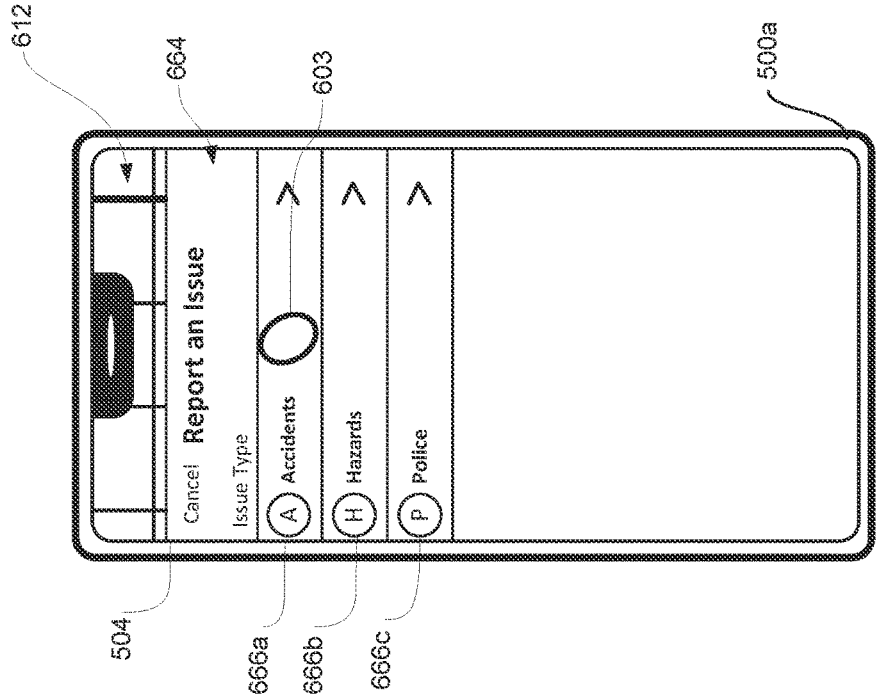
Figure 6Q:
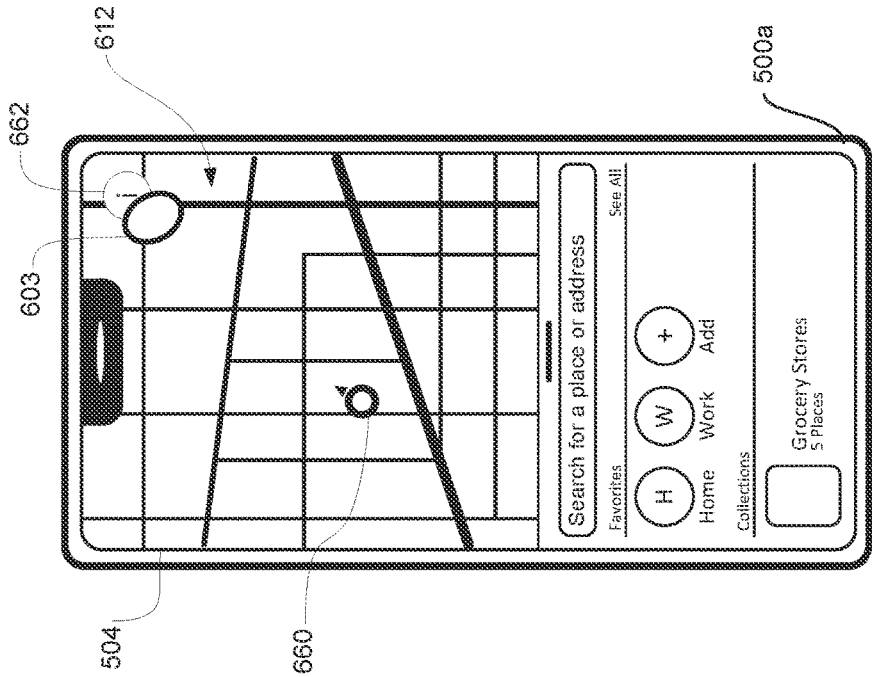
Figure 6T:
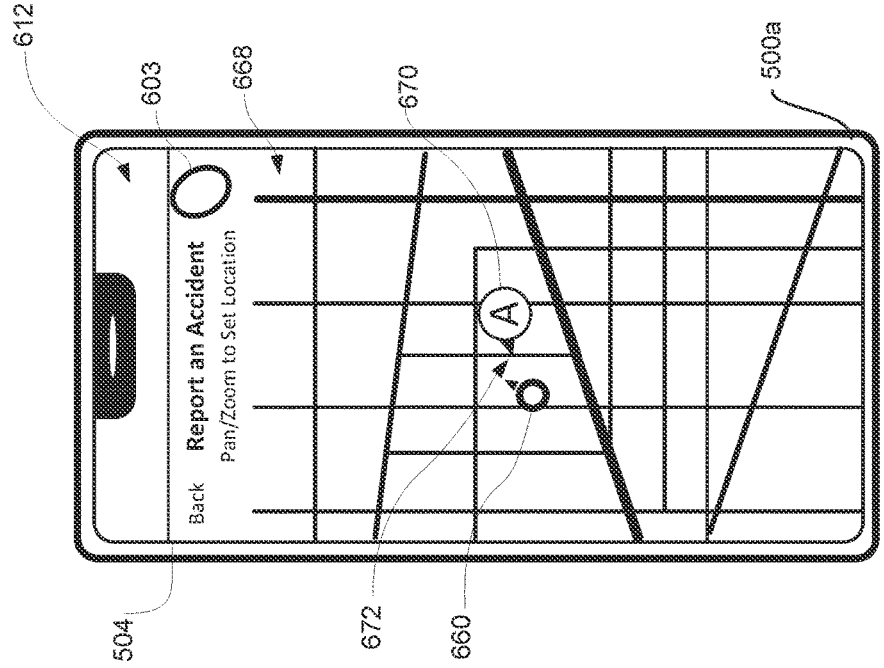
Figure 6S:
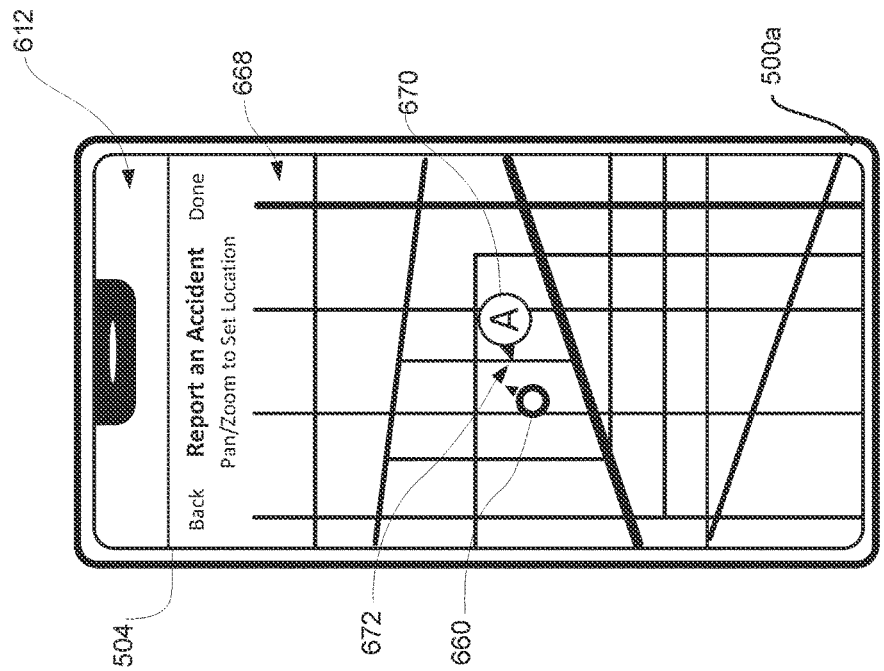
Figure 6V:
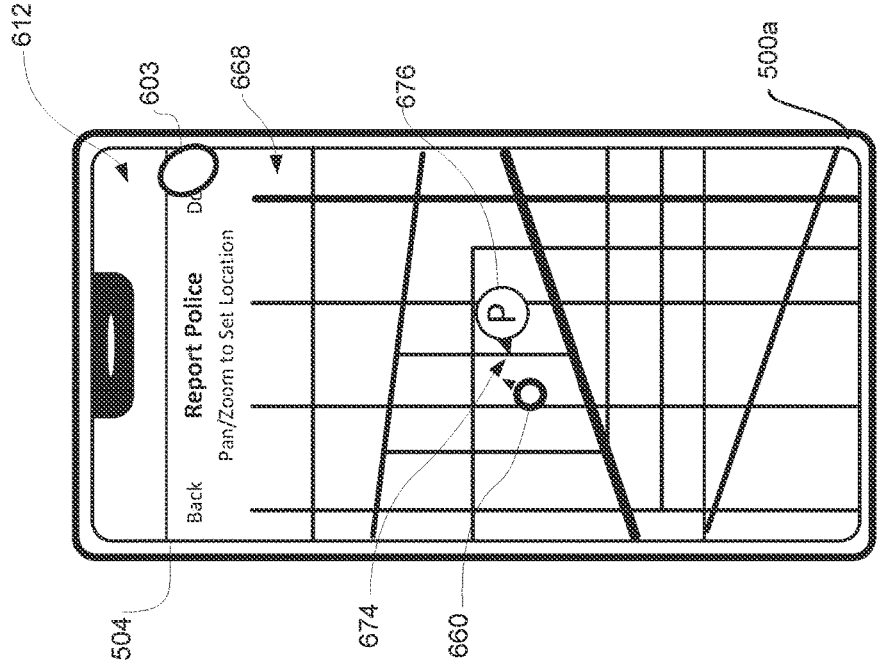
Figure 6U:
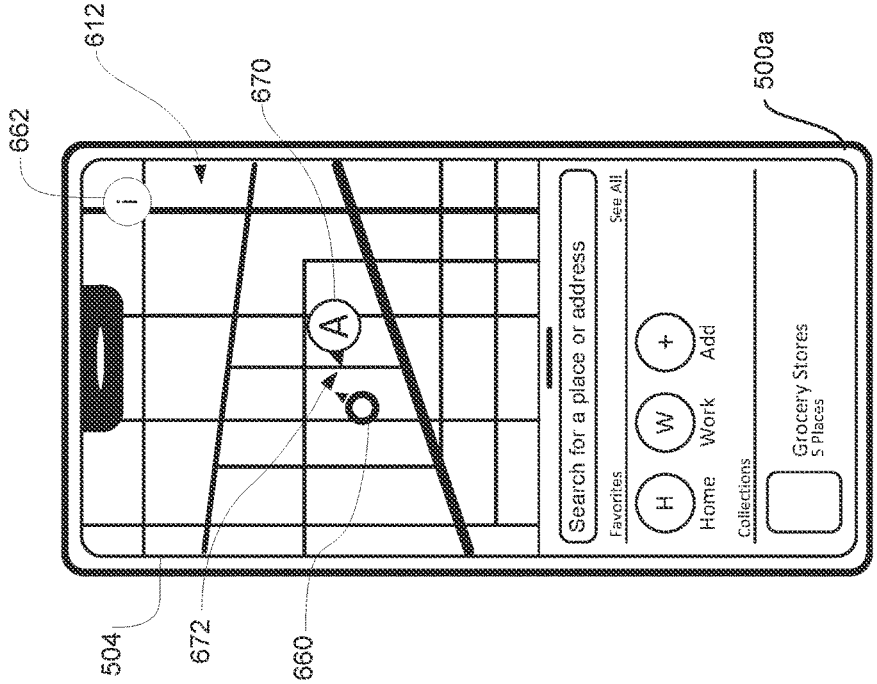
Figure 6W:
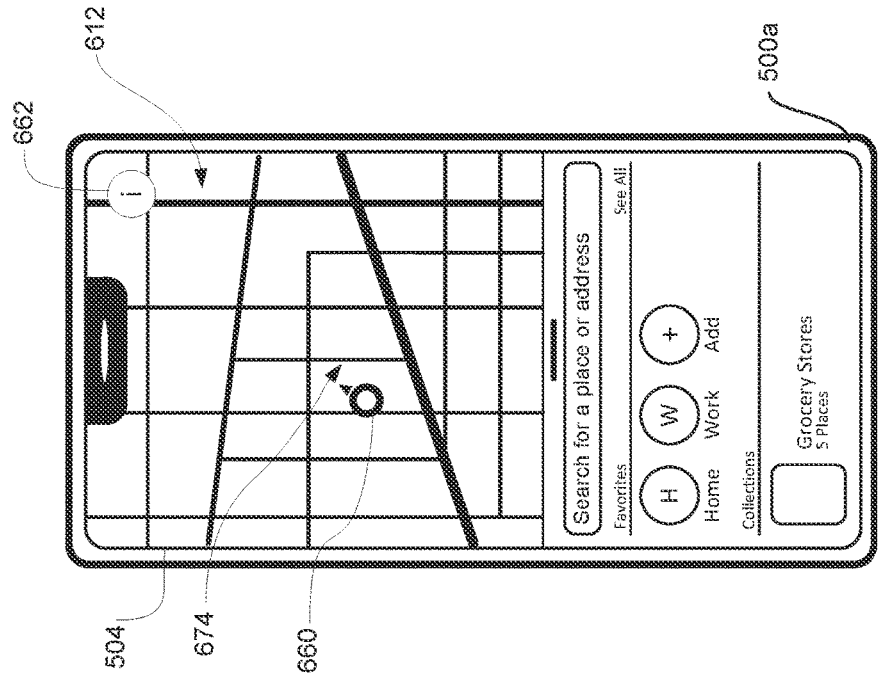

FIGS. 6A-6W illustrate exemplary ways in which an electronic device displays user interfaces for viewing and/or reporting information about incidents. The embodiments in these figures are used to illustrate the processes described below, including the processes described with reference to FIG. 7. Although FIGS. 6A-6W illustrate various examples of ways an electronic device is able to perform the processes described below with respect to FIG. 7, it should be understood that these examples are not meant to be limiting, and the electronic device is able to perform one or more processes described below with reference to FIG. 7 in ways not expressly described with reference to FIGS. 6A-6W.

FIG. 6A illustrates an exemplary device 500a (e.g., corresponding to a device 500) displaying a user interface. In some embodiments, the user interface is displayed via a display generation component. In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device.

In some embodiments, an electronic device (e.g., device 500a) can include a maps application. For example, the maps application can present maps, routes, location metadata, and/or imagery (e.g., captured photos) associated with various geographical locations, points of interest, etc. The maps application can obtain map data that includes data defining maps, map objects, routes, points of interest, imagery, etc., from a server. For example, the map data can be received as map tiles that include map data for geographical areas corresponding to the respective map tiles. The map data can include, among other things, data defining roads and/or road segments, metadata for points of interest and other locations, three-dimensional models of the buildings, infrastructure, and other objects found at the various locations, and/or images captured at the various locations. The maps application can request, from the server through a network (e.g., local area network, cellular data network, wireless network, the Internet, wide area network, etc.), map data (e.g., map tiles) associated with locations that the electronic device frequently visits. The maps application can store the map data in a map database. The maps application can use the map data stored in map database and/or other map data received from the server to provide the maps application features described herein (e.g., navigation routes, maps, navigation route previews, etc.).

In some implementations, a system can include the server. For example, the server can be a computing device, or multiple computing devices, configured to store, generate, and/or serve map data to various user devices (e.g. device 500a), as described herein. For example, the functionality described herein with reference to the server can be performed by a single computing device or can be distributed amongst multiple computing devices.

As shown in FIG. 6A, the electronic device 500a presents a maps user interface 612 (e.g., of a maps application installed on device 500a) 602 on touch screen 504. In some embodiments, user interface 612 is any user interface that displays information about one or more (e.g., physical) locations. In FIG. 6A, the maps user interface 612 is currently presenting driving directions (e.g., navigation directions) along a route. Current location indicator 610 indicates the current location of the electronic device 500a in the area depicted by the map in the maps user interface 612. As shown in FIG. 6A, the speed limit for the road on which device 500a is currently traveling is 35 mph (e.g., device 500a is displaying a speed limit indicator, though in other embodiments, device 500a does not display the speed limit indicator). Maps user interface 612 also includes an information user interface element 614 that provides information about the route (e.g., the estimated time of arrival at the destination (10:47), the estimated time remaining until reaching the destination (22 minutes), and the distance remaining until reaching the destination (4.0 miles)).

In some embodiments, information user interface element 614 in FIG. 6A is expandable in response to selection of selectable option 630. In FIG. 6A, device 500a detects selection of element 630 (e.g., via a tap of contact 603 on element 630). In response to detecting the selection of element 630, device 500a expands information user interface element 614 as shown in FIG. 6B. Expanded user interface element 614 includes various selectable options 636 to perform various operations associated with the displayed map and/or navigation directions. For example, expanded user interface element 614 optionally includes selectable option 636a that is selectable to initiate a process to add a stop to the current navigation directions, selectable option 636b that is selectable to initiate a process to change audio settings associated with the current navigation directions, selectable option 636c that is selectable to initiate a process to share an estimated time of arrival at the destination with another electronic device (e.g., another user), selectable option 636d that is selectable to initiate a process to view details about multiple segments of the current navigation directions, selectable option 636e that is selectable to initiate a process to end the current navigation directions, and selectable option 636f that is selectable to initiate a process to report an incident at the current location of device 500a. Expanded user interface element 614 also includes selectable option 632 to collapse user interface element 614 (e.g., to return to the view in FIG. 6A). It is understood that in some embodiments, one or more of selectable options 636 are not displayed by device 500a and/or that different selectable options are displayed.

In FIG. 6B, device 500a detects selection of selectable option 636f (e.g., any input corresponding to a request to report an incident, which is the existence of a temporary characteristic, such as the existence of a hazard, an accident, personnel (e.g., police, fire, etc.), or the like. In response to the selection, device 500a displays reporting user interface element 616 in the maps user interface 612 as shown in FIG. 6C. The reporting user interface element 616 includes selectable option 634 for ceasing display of user interface element 616 (e.g., and returning to the state shown in FIG. 6B). User interface element 616 also includes selectable options 638 for reporting incidents of different types at the current location of device 500a. For example, user interface element 616 includes selectable option 638a that is selectable to initiate a process to report the existence of an accident at the current location of device 500a, selectable option 638b that is selectable to initiate a process to report the existence of a hazard (e.g., traffic slowdown, pothole, object in the road, etc.) at the current location of device 500a, and selectable option 638c that is selectable to initiate a process to report the existence of police personnel (e.g., or other types of emergency personnel, such as firefighters, emergency medical technicians, etc.) at the current location of device 500*a*. It is understood that user interface element 616 optionally includes different and/or fewer options for reporting different and/or fewer incidents.

In FIG. 6C, device 500*a* detects selection of selectable option 638*a* for reporting an accident at the current location of device 500*a*. In response, device 500*a* displays reporting confirmation user interface element 618 in the maps user interface, as shown in FIG. 6D. Reporting confirmation user interface element 618 in FIG. 6D includes information identifying the type of incident that is being reported (e.g., "Reporting an Accident"), information about the location at which the incident is being reported (e.g., "Lincoln Blvd S"), selectable option 640 that is selectable to cancel the process for reporting the incident (e.g., to return to the state of FIG. 6C), and selectable option 642 that is selectable to confirm the reporting of the incident. In some embodiments, selectable option 642 is associated with a timer that, upon expiration, causes the reporting of the incident to be confirmed without detecting the selection of selectable option 642. For example, the timer is optionally 5, 10 or 15 seconds in length, and if upon display of user interface element 618 device 500*a* does not detect input selecting options 640 or 642 for the length of the timer, device 500*a* optionally responds to the expiration of the timer in the same manner it would respond to selection of selectable option 642. In some embodiments, maps user interface 612 includes an indication of the timer and how much time remains in the timer; for example, in FIG. 6D, selectable option 642 includes representation 643 of a timer bar whose fill counts down from right to left, where complete filling of the representation 643 corresponds to the full amount of time remaining on the timer, and complete emptiness of the representation 643 corresponds to no time remaining on the timer. Other or alternative indications of the timer are possible.

In FIG. 6D, device 500*a* detects selection of selectable option 642 (or detects another input corresponding to a request to report the accident). In response, device 500*a* updates maps user interface 612 as shown in FIG. 6E. Specifically, device 500*a* ceases display of user interface element 618 and redisplays user interface element 614. Further device 500*a* displays, in the map that is displayed in maps user interface 612, representation 652 of the accident that was reported in response to the selection in FIG. 6D at location 650 (e.g., the location of device 500*a* when device 500*a* initiated the process to report the accident and/or the location of device 500*a* when device 500*a* detected selection of option 642 in FIG. 6D). In some embodiments, device 500*a* transmits the reported information about the incident (e.g., incident location, incident type, etc.) to a server such that the reported information can be used later to provide information about the reported incident on other devices (or device 500*a*). As shown in FIG. 6E, representation 652 indicates the type of incident that was reported at location 650 (e.g., "A" for an accident). As a result of the reporting of the accident by device 500*a*, other devices (or device 500*a*) will optionally be able to present information about the accident (e.g., when those other device or device 500*a* are displaying a map that includes location 650), as will be described later.

Reporting the existence of hazards is optionally the same as the process described and shown for reporting accidents, except as described below. For example, in response to detecting the selection of option 638*b* in FIG. 6C, device 500*a* displays reporting confirmation user interface element 618 that includes information about the type of incident being reported and the location at which the incident is being reported, as shown in FIG. 6F (including analogous elements described with reference to FIG. 6D). In FIG. 6F, device 500*a* detects selection of selectable option 642. In response, device 500*a* updates maps user interface 612 as described previously with reference to FIG. 6E, except that instead of representation 652 corresponding to an accident, device 500*a* displays representation 654 corresponding to a hazard at location 651 at which the hazard was reported, as shown in FIG. 6G. In some embodiments, device 500*a* transmits the reported information about the incident (e.g., incident location, incident type, etc.) to a server such that the reported information can be used later to provide information about the reported incident on other devices (or device 500*a*). As shown in FIG. 6G, representation 654 indicates the type of incident that was reported at location 651 (e.g., "H" for a hazard). As a result of the reporting of the hazard by device 500*a*, other devices (or device 500*a*) will optionally be able to present information about the hazard (e.g., when those other device or device 500*a* are displaying a map that includes location 651), as will be described later. In some embodiments, reporting the existence of other temporary characteristics (e.g., non-personnel incidents) optionally proceeds in the same/analogous manner as the reporting of accidents and/or hazards described above.

Some incidents (e.g., sensitive incidents) may be reported, but not displayed at the location on the map where they are reported. These incidents may be incidents in which exact location data for the incident may be not known, hidden, modified, or otherwise obfuscated when provided to users. For example, the exact location of a police officer may not be displayed on a map application to protect the police officer's safety and/or privacy. Reporting the existence of such incidents, e.g., police (or other) personnel, is optionally the same as the process described and shown for reporting accidents and/or hazards, except as described below. For example, in response to detecting the selection of option 638*c* in FIG. 6C, device 500*a* displays reporting confirmation user interface element 618 that includes information about the type of incident being reported and the location at which the incident is being reported, as shown in FIG. 6H (including analogous elements described with reference to FIG. 6D). In FIG. 6H, device 500*a* detects selection of selectable option 642. In response, device 500*a* updates maps user interface 612 as described previously with reference to FIG. 6E, except that device 500*a* does not display any representation of the existence of police personnel at location 653 at which the police personnel was reported, as shown in FIG. 6I. In some embodiments, the exact location of police personnel (or other personnel) reported by users is not shown in maps user interface 612, though the presence of police personnel at location 653 is still communicated to the server (e.g., device 500*a* transmits the reported information about the incident (e.g., incident location, incident type, etc.) to a server such that the reported information can be used later to provide information about the reported incident on other devices (or device 500*a*). As a result of the reporting of the police personnel by device 500*a*, other devices (or device 500*a*) will optionally be able to present information about the police personnel (e.g., when those other devices or device 500*a* are displaying a map that includes location 653), as will be described later. In some embodiments, reporting the existence of other types of personnel (e.g., fire, paramedic, etc.) or other temporary characteristics (e.g., sensitive incidents) optionally proceeds in the same/analogous manner as the reporting of police personnel described above.

While some embodiments have been described above in the context of reporting incidents while navigation directions are being provided by the electronic device, it is understood that the reporting of incidents while the electronic device is not providing navigation directions is also within the scope of this disclosure (e.g., as described with reference to FIGS. 6Q-6W).

The display of information related to (e.g., previously-reported) incidents (e.g., accidents, hazards, police personnel) will now be described. In FIG. 6J, device 500b (e.g., different from device 500a) is displaying maps user interface 612. In FIG. 6J, device 500b is displaying navigation directions on a map, though it is understood in some embodiments device 500b is not displaying navigation directions when displaying information about the various types of reported incidents described herein. As described previously, an accident has been reported by device 500a at location 650. In some embodiments, in response to determining that device 500b is within a threshold distance of location 650 (e.g., 1 mile, 0.5 miles, 2 miles) and/or that location 650 is on the route of the navigation directions being presented by device 500b, device 500b displays in maps user interface 612 an upcoming incident user interface element 620, as shown in FIG. 6J. User interface element 620 optionally includes information about the type of incident that is upcoming (e.g., "Accident Ahead") and information about how many other devices (e.g., users) have reported the incident (e.g., "Reported by 5 drivers"). In some embodiments, device 500b displays user interface element 620 before location 650 is visible on the map in maps user interface 612 (e.g., location 650 is outside of the portion of the map that is currently displayed by device 500b in maps user interface 612). In some embodiments, device 500b displays user interface element 620 while location 650 is visible on the map in maps user interface 612 (e.g., location 650 is within the portion of the map that is currently displayed by device 500b in maps user interface 612). User interface element 620 also includes selectable option 634 to dismiss user interface element 620.

In some embodiments, when the portion of the map that corresponds to location 650 is displayed in maps user interface 612, device 500b also displays visual representation 652 of the incident at location 650. As previously described, visual representation 652 indicates the type of incident that was reported at location 650 (e.g., "A" for an accident).

After displaying upcoming incident user interface element 620, device 500b optionally displays incident existence confirmation user interface element 622 as shown in FIG. 6K. In some embodiments, the incident existence confirmation user interface element 622 is displayed in response to certain criteria being met (e.g., after displaying incident user interface element 620). For example, if device 500b is within a threshold distance of the location of the relevant incident (e.g., within 100, 200 or 500 feet of the relevant incident), and if separate confirmation criteria are satisfied, then device 500b optionally displays incident existence confirmation user interface element 622. The confirmation criteria optionally include a criterion that is satisfied when the elapsed time since the incident was last confirmed by a user (e.g., another user at another electronic device via a confirmation user interface) is longer than a time threshold (e.g., 5 minutes, 20 minutes, 30 minute), and is not satisfied when the elapsed time since the incident was last confirmed by a user is shorter than the time threshold. If device 500b is within the threshold distance of the relevant incident, but if the confirmation criteria are not satisfied (e.g., because another user has very recently (e.g., 2 minutes prior) confirmed the incident), device 500b optionally does not display incident existence confirmation user interface 622, as shown in FIG. 6M.

Returning to FIG. 6K, user interface element 622 optionally includes information identifying the type of incident that is being displayed (e.g., "Accident Ahead"), information about how many other devices (e.g., users) have reported the incident (e.g., "Reported by 5 drivers"), selectable option 644 that is selectable to initiate a process to report that the incident is no longer at location 650, and selectable option 646 that is selectable to confirm the continued existence of the incident at location 650. In some embodiments, selectable option 646 is associated with a timer that, upon expiration, causes the continued existence of the incident to be confirmed without detecting the selection of selectable option 646. For example, the timer is optionally 5, 10 or 15 seconds in length, and if upon display of user interface element 622 device 500b does not detect input selecting options 644 or 646 for the length of the timer, device 500b optionally responds to the expiration of the timer in the same manner it would respond to selection of selectable option 646. In some embodiments, maps user interface 612 includes an indication of the timer and how much time remains in the timer; for example, in FIG. 6K, selectable option 646 includes a representation of a timer bar (e.g., as in FIG. 6D) whose fill counts down from right to left, where complete filling of the timer bar corresponds to the full amount of time remaining on the timer, and complete emptiness of the timer bar corresponds to no time remaining on the timer, though other representations or the timer are also possible.

In some embodiments, in response to detecting selection of selectable option 644, device 500b transmits information to a server that indicates that the incident is no longer at location 650—the server then optionally responds accordingly with respect to displaying information about the incident at location 650 to other devices (or device 500b). In some embodiments, in response to detecting selection of selectable option 644, device 500b ceases to display representation 652 on the map. In some embodiments, in response to detecting selection of selectable option 646, device 500b transmits information to a server that indicates the incident's continued existence at location 650—the server then optionally responds accordingly with respect to displaying information about the incident at location 650 to other devices (or device 500b). In some embodiments, in response to detecting selection of selectable option 646, device 500b continues to display representation 652 on the map.

In FIG. 6K, device 500b detects selection of selectable option 646. As a result, when another device (e.g., device 500c or device 500a, corresponding to devices 500) is displaying information in the maps user interface 612 associated with the incident at location 650, that device optionally indicates that the incident was "Reported by 6 drivers" as shown in FIG. 6L, as opposed to having been "Reported by 5 drivers" (as shown in FIGS. 6J-6K) before the continued existence of the incident was reported in FIG. 6K.

Details described with reference to displaying information about and/or confirming the existence of an accident as shown in FIGS. 6J-6M optionally apply in the same manner to displaying information about and/or confirming the existence of a hazard (e.g., modified appropriately to indicate a hazard rather than an accident) or other temporary characteristics (e.g., non-personnel incidents, other than, for example, sensitive incidents). Displaying information about the existence of an incident (e.g., sensitive incident) where, for reasons such as privacy or safety concerns, the exact location of the incident is hidden, modified, or otherwise obfuscated on the map, e.g., the location of police personnel (or other personnel), will now be described. As described previously, in some embodiments, it is beneficial to not show the precise location of an incident (e.g., a sensitive incident) on the map in maps user interface 612. For example, in FIG. 6N, device 500b (e.g., different from device 500a) is displaying maps user interface 612. In FIG. 6N, device 500b is displaying navigation directions on a map. As described previously, a police officer has been reported by device 500a at location 653. In some embodiments, in response to determining that device 500b is within a threshold distance of location 653 (e.g., 1 mile, 0.5 miles, 2 miles) and/or that location 653 is on the route of the navigation directions being presented by device 500b, device 500b displays in maps user interface 612 an upcoming incident user interface element 620, as shown in FIG. 6N. User interface element 620 optionally includes information about the type of incident that is upcoming (e.g., "Police") and information about how many other devices (e.g., users) have reported the incident (e.g., "Reported by 2 drivers"). User interface element 620 also optionally includes selectable option 634 to dismiss user interface element 620 and information about a distance within which (e.g., from a current location of device 500b) the police personnel was reported (e.g., "Next 1.5 mi"). However, in contrast with what is displayed in FIG. 6J, in FIG. 6N, even though location 653 is included in a portion of the map that is currently displayed in maps user interface 612, device 500b does not display an indication (e.g., similar to representations 652 or 654) of the presence of the police personnel at location 653. It is understood that indicator 653 is illustrated in FIG. 6N for purposes of description only, and that device 500b in FIG. 6N is not displaying indicator 653 on touchscreen 504 or any indication of the presence of the police personnel at location 653.

In some embodiments, the information about the distance within which an incident (e.g., sensitive incident) was reported, e.g., an incident where police personnel was reported, (e.g., "Next 1.5 mi") that is displayed in user interface element 620 is optionally not an exact distance of the location 653 from device 500b. For example, location 653 is optionally within the distance provided, but is not at the distance provided (e.g., location 653 is optionally 1 mile away, though the indication indicates "next 1.5 miles"). In some embodiments, the distance indicated in user interface element 620 does not update as device 500b moves closer to or further away from location 653, further protecting the exact position of location 653. In some embodiments, the distance indicated in user interface element 620 remains fixed as device 500b moves closer to or further away from location 653. In some embodiments, user interface element 620 is displayed until the distance indicated in the user interface element 620 is reached (e.g., after having passed location 653 0.25, 0.5, 1 mile earlier), at which point device 500b ceases to display user interface element 620. In some embodiments, user interface element 620 is displayed until location 653, different from the indicated distance, is reached (or in some embodiments a certain distance before or after location 653, such as 100, 250 or 500 feet), at which point device 500b optionally ceases to display user interface element 620.

Therefore, as described with reference to FIG. 6N, device 500b optionally does not display any indication in maps user interface 612 of location 653 and/or the exact location of some incidents, e.g., sensitive incidents that have safety and/or privacy concerns such as the location of police (or other) personnel. For example, in FIG. 6O, device 500b has moved closer to location 653, but the distance indicated in user interface element 620 remains unchanged (e.g., "Next 1.5 mi"), and in FIG. 6P, device 500b has passed location 653, but user interface element 620 continues to be displayed, and the distance information displayed in user interface element 620 remains unchanged (e.g., "Next 1.5 mi"). As such, in some embodiments, device 500b does not display or update locational information related to sensitive incidents (e.g., personnel or non-personnel) in a way that can communicate the exact location of such incidents on the map. Further, as shown in FIGS. 6N-6P, in some embodiments device 500b does not display a confirmation user interface element (e.g., similar to confirmation user interface element 622 shown in FIG. 6K) for confirming the existence of the incident at location 653, further protecting the exact position of location 653. For example, in FIG. 6O, device 500b is optionally within a threshold distance of location 653 that would have otherwise caused device 500b to display a confirmation user interface element (e.g., within the same distance of the location of the incident as in FIG. 6K). However, because location 653 is the reported location of a sensitive incident, e.g., the location of police (or other) personnel, (rather than an accident or hazard), device 500b optionally does not display the confirmation user interface element. Additionally, in some embodiments, the server(s) that collect information about reported incidents optionally do(es) not transmit information about the exact position of location 653 to device 500b, which further protects the exact position of location 653. The above-described aspects of displaying information about the reported location of police personnel optionally applies analogously to the reported location of other sensitive incidents, e.g., other types of personnel (e.g., fire fighters, emergency medical technicians, construction workers, etc.).

Although FIGS. 6A-6P have been described in the context of a maps user interface during which navigation directions were being presented, some or all of the aspects of this disclosure also apply to a maps user interface in which navigation directions are not being presented. Some of these examples will be described with reference to FIGS. 6Q-6W. For example, in FIG. 6Q, device 500a is displayed a maps user interface 612 while not presenting navigation directions. Maps user interface 612 optionally includes a map, and a location indicator 660 that indicates the current location of device 500a on map. Maps user interface 612 also optionally includes selectable option 662 that is selectable to, optionally among other things, initiate a process to report an incident (e.g., accident, hazard, police activity, etc.).

In FIG. 6Q, device 500a detects selection of selectable option 662. In response, device 500a updates maps user interface 612 to include a reporting user interface 664, as shown in FIG. 6R. Reporting user interface 664 optionally includes a selectable "Cancel" option that is selectable to cancel the reporting process (e.g., to revert to the state in FIG. 6Q). Reporting user interface 664 also optionally includes selectable options 666 to report various incidents. For example, reporting user interface 664 includes selectable option 666a that is selectable to initiate a process to report an accident, selectable option 666b that is selectable to initiate a process to report a hazard, and selectable option 666c that is selectable to initiate a process to report police personnel; however, it is understood that in some embodiments additional and/or alternative types of incidents can be reported from reporting user interface 664.

In FIG. 6R, device 500a detects selection of selectable option 666a. In response, device 500a updates maps user interface 612 to display an accident location reporting user interface 668 in which the location 672 of the accident to be reported is set, as shown in FIG. 6S. User interface 668 optionally includes a selectable "Back" option that is selectable to revert to the state in FIG. 6R without completing the reporting of the accident, and a selectable "Done" option that is selectable to complete the reporting of the accident (e.g., analogous to selection of option 642 in FIG. 6D). User interface 668 also optionally includes a representation of a map of the area surround device 500a, location indicator 660 that is shown on the map at a position corresponding to the current location of device 500a, and an accident indicator 670 that is shown on the map at a position corresponding to the location 672 at which the accident is to be reported, and that indicates the type of incident being reported (e.g., "A" for accident). A user of device 500a is able to move the position of accident indicator 670 on map to set the desired reporting location 672 for the accident (e.g., by moving accident indicator 670 via zooming or movement inputs provided to device 500a, or moving the map via zooming or movement inputs provided to device 500a).

In FIG. 6T, device 500a detects selection of the selectable "Done" option in user interface 668. In response, device 500a updates maps user interface 612, as shown in FIG. 6U, to cease displaying user interface 668, and redisplay the maps user interface as was shown in FIG. 6Q. However, device 500a also displays accident indicator 670 at the position in the map corresponding to the location 672 at which the accident was reported in FIG. 6T. In some embodiments, device 500a transmits the reported information about the incident (e.g., incident location, incident type, etc.) to a server such that the reported information can be used later to provide information about the reported incident on other devices (or device 500a). As shown in FIG. 6U, representation 670 indicates the type of incident that was reported at location 672 (e.g., "A" for an accident). As a result of the reporting of the accident by device 500a, other devices (or device 500a) will optionally be able to present information about the accident (e.g., when those other device or device 500a are displaying a map that includes location 672), as described in this disclosure (e.g., during navigation directions or not during navigation directions).

The reporting of hazards (or other non-sensitive incidents) is optionally the same as the reporting of accidents shown in FIGS. 6Q-6U (modified appropriately to indicate a hazard rather than an accident). The reporting of sensitive incidents, e.g., police (or other) personnel, will now be described. In some embodiments, in response to the selection of selectable option 666c in FIG. 6R, device 500a updates maps user interface 612 to display a police location reporting user interface 668 in which the location 674 of the sensitive incident, e.g., police personnel, to be reported is set, as shown in FIG. 6V. The content and operation of user interface 668 is optionally the same as shown and described with reference to FIGS. 6S-6T, except that user interface 668 includes representation 676 that indicates police (e.g., "P" for police) and includes text that indicates the reporting being done is for police personnel (rather than for an accident).

In FIG. 6V, device 500a detects selection of the selectable "Done" option in user interface 668. In response, device 500a updates maps user interface 612, as shown in FIG. 6W, to cease displaying user interface 668, and redisplay the maps user interface as was shown in FIG. 6U. However, in FIG. 6W, device 500a does not display representation 676 at the position in the map corresponding to the location 674 at which the sensitive incident, e.g., police personnel, was reported in FIG. 6V. As has been previously described in this disclosure, avoiding the display of any indication in the maps user interface 612 of the exact location of sensitive incidents, e.g., police (or other) personnel, helps to protect the privacy and/or security of those incidents. However, as before, device 500a optionally still transmits the reported information about the incident (e.g., incident location, incident type, etc.) to a server such that the reported information can be used later to provide information about the reported incident on other devices (or device 500a). As a result of the reporting of the sensitive incident, e.g., police personnel, by device 500a, other devices (or device 500a) will optionally be able to present information about the police personnel (e.g., when those other device or device 500a are displaying a map that includes location 674), as described in this disclosure (e.g., during navigation directions or not during navigation directions). The reporting of other personnel incidents (e.g., fire, paramedic, etc.) while device 500a is not presenting navigation directions is optionally the same as described above for the reporting of police personnel.

FIG. 7 is a flow diagram illustrating a method 700 for displaying and/or reporting incident information on an electronic device. The method 700 is optionally performed at an electronic device such as device 100, device 300, device 500a, device 500b, and device 500c as described above with reference to FIGS. 1A-1B, 2-3, 4A-4B and 5A-5H. Some operations in method 700 are, optionally combined and/or the order of some operations is, optionally, changed.

As described below, the method 700 provides ways in which an electronic device displays and/or reports incident information. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., device 500a, 500b, 500c) in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the electronic device displays (702), via the display generation component, a map user interface including a representation of a map, such as in FIG. 6J (e.g., a maps application running on the electronic device, where the maps application is displaying a map area). In some embodiments, the map area includes the location of the electronic device, and in some embodiments, it does not. In some embodiments, the electronic device is displaying the map while the electronic device is providing navigation directions to the electronic device. In some embodiments, the electronic device is displaying the map without providing navigation directions to the electronic device. In some embodiments, the representation of the map includes a respective location associated with a respective temporary characteristic, such as in FIG. 6J. In some embodiments, the respective temporary characteristic has been reported by a user. For example, the area of the map that is being displayed includes a location for which a temporary characteristic has been reported by a user, such as a user who is someone other than a current user of the electronic device (e.g., reported by that user using another electronic device while that user was in proximity to the location, prior to when the current user is viewing the map user interface). In some embodiments, the temporary characteristic is associated with a road displayed in the map, a pathway displayed in the map, a freeway displayed in the map, etc. In some embodiments, the temporary characteristic includes one or more of traffic conditions, the existence of an accident, the existence of a hazard (e.g., potholes, stopped car in a lane, etc.), the existence of personnel (e.g., police, fire, etc.).

In some embodiments, in accordance with a determination that the respective temporary characteristic is of a first type (e.g., temporary characteristics other than those that are sensitive such as the existence of particular personnel, such as police officers, firefighters, etc.), the representation of the map includes a visual indication of the respective temporary characteristic displayed at the respective location on the representation of the map (704), such as in FIG. 6J (e.g., the map includes an icon, displayed at the location of the temporary characteristic, that indicates the existence of that temporary characteristic). In some embodiments, the icon is selectable to display, in the map user interface, additional information about the temporary characteristic, such as a degree or extent of the temporary characteristic that is optionally not displayed in the original icon itself. In some embodiments, in accordance with a determination that the respective temporary characteristic is of a second type, different from the first type (e.g., temporary characteristic that indicates the existence of sensitive incidents such as particular personnel at the location, such as police officers, firefighters, etc.; in some embodiments, the existence of a first type of personnel (e.g., police) is considered to be the second type of temporary characteristic, while the existence of a second type of personnel (e.g., firefighters) is considered to be the first type of characteristic), the representation of the map does not include a visual indication of the respective temporary characteristic displayed at the respective location on the representation of the map (706), such as in FIG. 6N. For example, the map does not include an icon, displayed at the location of the temporary characteristic, that indicates the existence of that temporary characteristic. The above-described manner of selectively displaying visual indications of temporary characteristic allows the electronic device to quickly and efficiently convey information that should be conveyed to the user of the electronic device without conveying information that should not be conveyed to the user of the electronic device, which additionally reduces power usage and improves battery life of the electronic device by enabling the user to use the electronic device more quickly and efficiency (e.g., by avoiding interaction with the electronic device with respect to temporary characteristics that should not be conveyed to the user).

In some embodiments, the map user interface is displaying navigation directions (e.g., navigation directions from a first location to a section location in the representation of the map; in some embodiments, the first and/or second locations are currently displayed in the map user interface on the representation of the map; in some embodiments, a portion or an entirety of a route from the first location to the second location is currently displayed in the map user interface on the representation of the map), and in accordance with the determination that the respective temporary characteristic is of the first type, the representation of the map includes the visual indication of the respective temporary characteristic displayed at the respective location on the representation of the map while the map user interface is displaying the navigation directions, such as in FIGS. 6J-6M. For example, the indication of the temporary characteristic is displayed overlaid on the representation of the map while navigation directions are also displayed overlaid on the representation of the map. In some embodiments, the indication of the temporary characteristic is shown because the route of the navigation directions includes the location associated with the temporary characteristic. In some embodiments, the indication of the temporary characteristic is shown in response to determining that the electronic device is within a distance threshold (e.g., 0.5 miles, 1 mile, 2 miles) of the temporary characteristic and/or in response to determining that the area of the representation of the map shown in the map user interface includes the location of the temporary characteristic. In some embodiments, the indication of the temporary characteristic is shown even when navigation directions are not being provided in the map user interface. In some embodiments, the indication of the temporary characteristic is shown only when navigation directions are being provided in the map user interface. In some embodiments, the indication of the temporary characteristic is shown only when navigation directions are not being provided in the map user interface. The above-described manner of displaying the indication while providing navigation directions allows the electronic device to quickly and efficiently convey temporary characteristic information that is relevant to the navigation directions, which additionally reduces power usage and improves battery life of the electronic device by enabling the user to use the electronic device more quickly and efficiency (e.g., by avoiding the need for the user to provide separate input to view the temporary characteristics while being provided navigation directions).

In some embodiments, while displaying the map user interface (e.g., and the representation of the map that includes the respective location associated with the respective temporary characteristic that has been reported by the user), in accordance with a determination that one or more first criteria are satisfied (e.g., the electronic device is within a threshold distance of the location of the temporary characteristic, such as being within 100 feet, 200 feet, 500 feet of the location of the temporary characteristic, which is optionally on/along the route being followed by the user of the electronic device as part of navigation directions being provided by the electronic device), in accordance with the determination that the respective temporary characteristic is of the first type (e.g., temporary characteristics other than sensitive incidents such as those about the existence of particular personnel, such as police officers, firefighters, etc.; for example temporary characteristics such as traffic conditions, the existence of an accident, the existence of a hazard (e.g., potholes, stopped car in a lane, etc.)) and that one or more second criteria are satisfied (e.g., criteria for displaying a confirmation user interface for confirming the presence of the temporary characteristic; for example, the second criteria optionally include a criterion that is satisfied when the elapsed time since the temporary characteristic was last confirmed by a user (e.g., another user at another electronic device via a confirmation user interface) is longer than a time threshold (e.g., 5 minutes, 20 minutes, 30 minute), and is not satisfied when the elapsed time since the temporary characteristic was last confirmed by a user is shorter than the time threshold; in some embodiments, the second criteria are non-distance based criteria, different from the first criteria; in some embodiments, the second criteria are independent of the first criteria), the electronic device displays, in the map user interface, a confirmation user interface for confirming a presence of the respective temporary characteristic at the respective location, such as in FIG. 6K (e.g., a user interface that includes a selectable option that is selectable to confirm the existence of the temporary condition, and a selectable option that is selectable to indicate that the temporary condition is no longer in existence at the location). In some embodiments, the selectable option for confirming the temporary characteristic includes a timeout indication that indicates that receiving no input for longer than a time threshold (e.g., 5, 10 or 15 seconds) will automatically (e.g., without user input for doing so) confirm the existence of the temporary characteristic. In some embodiments, the confirmation user interface includes an indication of a number of users who have reported the existence of the temporary characteristic.

In some embodiments, in accordance with the determination that the respective temporary characteristic is of the second type (e.g., temporary characteristic that indicates the existence of sensitive incidents such as particular personnel at the location, such as police officers, firefighters, etc.), the electronic device forgoes displaying a confirmation user interface for confirming a presence of the respective temporary characteristic at the respective location, such as in FIG. 6O. For example, temporary characteristics of the second type optionally do not cause display of a confirmation user interface. The above-described manner of selectively displaying the confirmation user interface allows the electronic device to quickly and efficiently provide for confirmation of confirmable temporary characteristics but not for non-confirmable temporary characteristics (e.g., those that do not include a visual indication at a corresponding location on the representation of the map, therefore making it more difficult to accurately confirm or deny the existence of such temporary characteristic), which additionally reduces power usage and improves battery life of the electronic device by enabling the user to use the electronic device more quickly and efficiency (e.g., by avoiding erroneous confirmation inputs provided by the user).

In some embodiments, while displaying the map user interface, in accordance with the determination that the one or more first criteria are satisfied (e.g., the electronic device is within a threshold distance of the location of the temporary characteristic, such as being within 100 feet, 200 feet, 500 feet of the location of the temporary characteristic, which is optionally on/along the route being followed by the user of the electronic device as part of navigation directions being provided by the electronic device), in accordance with the determination that the respective temporary characteristic is of the first type (e.g., temporary characteristics other than sensitive incidents such as those about the existence of particular personnel, such as police officers, firefighters, etc.; for example temporary characteristics such as traffic conditions, the existence of an accident, the existence of a hazard (e.g., potholes, stopped car in a lane, etc.)) and that the one or more second criteria are not satisfied (e.g., criteria for displaying the confirmation user interface for confirming the presence of the temporary characteristic are not satisfied), the electronic device forgoes displaying the confirmation user interface for confirming the presence of the respective temporary characteristic at the respective location, such as in FIG. 6M. For example, even if the temporary characteristic is of the first type, if the existence of the temporary characteristic was confirmed recently (e.g., in the last 5, 20 or 30 minutes), the electronic device does not display the confirmation user interface for confirming the existence of the temporary characteristic. The above-described manner of not displaying the confirmation user interface in every instance allows the electronic device to quickly and efficiently provide for confirmation of confirmable temporary characteristics at appropriate times, but not when confirmation is not necessary or helpful (e.g., a minute or two after the temporary characteristic was last confirmed), which additionally reduces power usage and improves battery life of the electronic device by enabling the user to use the electronic device more quickly and efficiency (e.g., by avoiding displaying unnecessary user interfaces and receiving unnecessary inputs).

In some embodiments, while displaying the map user interface (e.g., and the representation of the map that includes the respective location associated with the respective temporary characteristic that has been reported by the user), in accordance with a determination that one or more first criteria are satisfied (e.g., the electronic device is within a threshold distance of the location of the temporary characteristic, such as being within 100 feet, 200 feet, 500 feet of the location of the temporary characteristic, which is optionally on/along the route being followed by the user of the electronic device as part of navigation directions being provided by the electronic device), in accordance with a determination that one or more second criteria are satisfied (e.g., criteria for displaying a confirmation user interface for confirming the presence of the temporary characteristic; for example, the second criteria optionally include a criterion that is satisfied when the elapsed time since the temporary characteristic was last confirmed by a user (e.g., another user at another electronic device via a confirmation user interface) is longer than a time threshold (e.g., 5 minutes, 20 minutes, 30 minute), and is not satisfied when the elapsed time since the temporary characteristic was last confirmed by a user is shorter than the time threshold; in some embodiments, the second criteria are non-distance based criteria, different from the first criteria; in some embodiments, the second criteria are independent of the first criteria), the electronic device displays, in the map user interface, a confirmation user interface for confirming a presence of the respective temporary characteristic at the respective location, such as in FIG. 6K (e.g., a user interface that includes a selectable option that is selectable to confirm the existence of the temporary condition, and a selectable option that is selectable to indicate that the temporary condition is no longer in existence at the location). In some embodiments, the selectable option for confirming the temporary characteristic includes a timeout indication that indicates that receiving no input for longer than a time threshold (e.g., 5, 10 or 15 seconds) will automatically (e.g., without user input for doing so) confirm the existence of the temporary characteristic. In some embodiments, the confirmation user interface includes an indication of a number of users who have reported the existence of the temporary characteristic.

In some embodiments, while displaying the confirmation user interface and without receiving user input for confirming the presence of the respective temporary characteristic at the respective location (e.g., without receiving selection of the "still here" or "cleared" options displayed in the confirmation user interface for the temporary characteristic), the electronic device initiates a process to confirm the presence of the respective temporary characteristic at the respective location. For example, in some embodiments, if an input selecting the "still here" or "cleared" options displayed in the confirmation user interface is not detected within 1, 10 or 15 seconds of displaying the confirmation user interface, the confirmation user interface "times out" and the lack of input is taken to be a confirmation of the existence of the temporary characteristic (e.g., similar to detection of selection of "still here"). In some embodiments, the confirmation user interface includes a visual indication of the countdown to the auto-confirmation of the existence of the temporary characteristic. The above-described manner of automatically confirming the existence of the temporary characteristic allows the electronic device to quickly and efficiently confirm its existence, which additionally reduces power usage and improves battery life of the electronic device by enabling the user to use the electronic device more quickly and efficiency (e.g., by reducing the need for the user to provide input to the electronic device to provide such confirmation).

In some embodiments, while displaying the map user interface (e.g., and the representation of the map that includes the respective location associated with the respective temporary characteristic that has been reported by the user), in accordance with a determination that one or more first criteria are satisfied (e.g., the electronic device is within a threshold distance of the location of the temporary characteristic, such as being within 1, 2, 3 miles of the location of the temporary characteristic, which is optionally on/along the route being followed by the user of the electronic device as part of navigation directions being provided by the electronic device), in accordance with the determination that the respective temporary characteristic is of the first type (e.g., temporary characteristics other than those about the existence of sensitive incidents such as particular personnel, such as police officers, firefighters, etc.; for example temporary characteristics such as traffic conditions, the existence of an accident, the existence of a hazard (e.g., potholes, stopped car in a lane, etc.)), the electronic device concurrently displays, in the map user interface, a first user interface that indicates that the respective temporary characteristic is upcoming and the visual indication of the respective temporary characteristic displayed at the respective location on the representation of the map, such as in FIG. 6J (e.g., an "upcoming" user interface that is displayed before a confirmation user interface (if one will be displayed)). In some embodiments, the "upcoming" user interface indicates the type of temporary characteristic (e.g., traffic, hazard, accident), an indication of a distance associated with the temporary characteristic (e.g., a distance remaining until the temporary characteristic is reached), and/or the number of users who have reported and/or confirmed the existence of the temporary characteristic. In some embodiments, for temporary characteristics of the first type, the indication of the distance is updated as the electronic device gets closer to or further away from the temporary characteristic, and indicates a distance remaining until the temporary characteristic is reached. In some embodiments, the "upcoming" user interface is different from the visual indication of the respective temporary characteristic, and is displayed at a different location in the maps user interface (e.g., at the bottom of the maps user interface) than the visual indication of the respective temporary characteristic (e.g., an icon that identifies the type of temporary characteristic), which is optionally displayed at its corresponding location on the representation of the map. In some embodiments, the "upcoming" user interface is displayed until the confirmation user interface is displayed, which optionally replaces the "upcoming" user interface. In some embodiments, if no confirmation user interface is displayed, the "upcoming" user interface is displayed until the location of the temporary characteristic is reached (or in some embodiments a certain distance before or after the location of the temporary characteristic, such as 100, 250 or 500 feet).

In some embodiments, in accordance with a determination that the respective temporary characteristic is of the second type (e.g., temporary characteristic that indicates the existence of sensitive incidents, such as particular personnel at the location, such as police officers, firefighters, etc.), the electronic device displays, in the map user interface, a second user interface that indicates that the respective temporary characteristic is upcoming without displaying the visual indication of the respective temporary characteristic displayed at the respective location on the representation of the map, such as in FIG. 6N. For example, an "upcoming" user interface that is the same as the "upcoming" user interface for temporary characteristics of the first type. In some embodiments, the "upcoming" user interface for the temporary characteristic of the second type is different from the "upcoming" user interface for the temporary characteristic of the first type in one or more of the ways described later—however, even then, in some embodiments both temporary characteristics of the first type and temporary characteristics of the second type cause display of "upcoming" user interfaces, despite the fact that temporary characteristics of the second type do not cause display of "confirmation" user interfaces (while temporary characteristics of the first type cause selective display of "confirmation" user interfaces). The above-described manner of displaying "upcoming" user interfaces for temporary characteristics of both types allows the electronic device to quickly and efficiently indicate that a temporary characteristic is upcoming, which additionally reduces power usage and improves battery life of the electronic device by enabling the user to use the electronic device more quickly and efficiency (e.g., by reducing the need for the user to provide input to the electronic device to provide such information).

In some embodiments, the first user interface includes a visual indication of a number of users that have reported the respective temporary characteristic at the respective location, such as in FIG. 6J, and the second user interface includes a visual indication of a number of users that have reported the respective temporary characteristic at the respective location, such as in FIG. 6N. For example, the "upcoming" user interfaces for both types of temporary characteristics include an indication such as "reported by 5 drivers" or "reported by 7 users" to indicate how many other users have reported and/or confirmed the existence of the temporary characteristic. The above-described manner of displaying the number of users who reported a temporary characteristic allows the electronic device to quickly and efficiently indicate the reliability of the existence of a given temporary characteristic, which additionally reduces power usage and improves battery life of the electronic device by enabling the user to use the electronic device more quickly and efficiency (e.g., by reducing the need for the user to provide input to the electronic device to provide such information).

In some embodiments, the second user interface includes a visual indication of a distance corresponding to where the respective temporary characteristic is located, wherein the distance is to a location different from where the respective temporary characteristic is located, such as in FIGS. 6N-6P. For example, the "upcoming" user interface of the second type of temporary characteristic optionally includes an approximate distance of the temporary characteristic (in contrast to the "upcoming" user interface of the first type temporary characteristic), such as an indication that recites "temporary characteristic (of the second type) next 2 miles," where the location of the temporary characteristic is within the distance provided, but is not at the distance provided (e.g., the temporary characteristic is optionally 1 mile away, though the indication indicates "next 2 miles"). In some embodiments, the distance indicated in the "upcoming" user interface does not update as the electronic device moves closer to or further away from the temporary characteristic. In some embodiments, the distance indicated in the "upcoming" user interface remains fixed as the electronic device moves closer to or further away from the temporary characteristic. In some embodiments, the "upcoming" user interface is displayed for an amount of time (e.g., 5, 10 or 20 seconds) and ceases to be displayed in response to reaching that amount of time. In some embodiments, the distance indicated in the "upcoming" user interface does update as the electronic device moves closer to or further away from the temporary characteristic (e.g., indicating "temporary characteristic (of the second type) next 1.5 miles" after the electronic device has moved closer to the temporary characteristic by 0.5 miles), while the mismatch or offset between the distance displayed and the actual location of the temporary characteristic is maintained (e.g., the temporary characteristic is actually 0.5 miles away from the electronic device, which is within the 1.5 miles displayed). In some embodiments, the "upcoming" user interface is displayed until the distance indicated in the "upcoming" user interface is reached (e.g., after having passed the actual location of the temporary characteristic 0.25, 0.5, 1 mile earlier), at which point the electronic device ceases to display the "upcoming" user interface. In some embodiments, the "upcoming" user interface is displayed until the actual location of the temporary characteristic, different from the indicated distance, is reached (or in some embodiments a certain distance before or after the actual location of the temporary characteristic, such as 100, 250 or 500 feet), at which point the electronic device ceases to display the "upcoming" user interface. In some embodiments, the amount of offset between the distance indication that is displayed and the actual location of the temporary characteristic changes from one particular temporary characteristic (of the second type) to another, even if both are related to police personnel for example; in some embodiments, the distance from the temporary characteristic at which the "upcoming" user interface is dismissed changes from one particular temporary characteristic (of the second type) to another, even if both are related to police personnel for example. The above-described manner of displaying approximate distance information for the second type of temporary characteristic allows the electronic device to quickly and efficiently convey some but not all information to the user about the location of the temporary characteristic, which additionally reduces power usage and improves battery life of the electronic device by enabling the user to use the electronic device more quickly and efficiency (e.g., by avoiding interaction with the electronic device with respect to temporary characteristics that should not be conveyed to the user).

It should be understood that the particular order in which the operations in method 700 and/or FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 7 are, optionally, implemented by components depicted in FIGS. 1A-1B. For example, displaying operation 702 is optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate the reporting and/or viewing of information about incidents. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data, in the present technology, can be used to the benefit of users. For example, the personal information data can be used to automatically perform operations with respect to reporting the locations and/or characteristics of incidents. Accordingly, use of such personal information data enables users to enter fewer inputs to perform an action with respect to reporting incidents. Further, other uses for personal information data that benefit the user are also contemplated by the present disclosure. For instance, user location data may be used to identify relevant incidents to display to a user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's location data when reporting and/or viewing incident information.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data can be recognized based on aggregated non-personal information data or a bare minimum amount of personal information, such as the location information being handled only on the user's device, or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component and one or more input devices:
displaying, via the display generation component, a map user interface including a representation of a map, wherein the representation of the map includes a respective location associated with a respective temporary characteristic, wherein:
in accordance with a determination that the respective temporary characteristic is of a first type, the representation of the map includes a visual indication of the respective temporary characteristic displayed at the respective location on the representation of the map, and
in accordance with a determination that the respective temporary characteristic is of a second type, different from the first type, the representation of the map does not include the visual indication of the respective temporary characteristic displayed at the respective location on the representation of the map; and
in accordance with a determination that one or more first criteria are satisfied:
in accordance with the determination that the respective temporary characteristic is of the second type, concurrently displaying, in the map user interface, a first user interface that indicates that the respective temporary characteristic is upcoming, without displaying the visual indication of the respective temporary characteristic at the respective location on the representation of the map, wherein the first user interface includes a visual indication of a distance corresponding to where the respective temporary characteristic is located, and wherein the distance is to a location different from where the respective location associated with the respective temporary characteristic is located.

2. The method of claim 1, wherein the map user interface is displaying navigation directions, and in accordance with the determination that the respective temporary characteristic is of the first type, the representation of the map includes the visual indication of the respective temporary characteristic displayed at the respective location on the representation of the map while the map user interface is displaying the navigation directions.

3. The method of claim 1, further comprising:
while displaying the map user interface:
in accordance with a determination that one or more second criteria are satisfied:
in accordance with the determination that the respective temporary characteristic is of the first type and that one or more third criteria are satisfied, displaying, in the map user interface, a confirmation user interface for confirming a presence of the respective temporary characteristic at the respective location; and
in accordance with the determination that the respective temporary characteristic is of the second type, forgoing displaying a confirmation user interface for confirming a presence of the respective temporary characteristic at the respective location.

4. The method of claim 3, further comprising:
while displaying the map user interface:
in accordance with the determination that the one or more second criteria are satisfied:
in accordance with the determination that the respective temporary characteristic is of the first type and that the one or more third criteria are not satisfied, forgoing displaying the confirmation user interface for confirming the presence of the respective temporary characteristic at the respective location.

5. The method of claim 1, further comprising:
while displaying the map user interface:
in accordance with a determination that one or more second criteria are satisfied:
in accordance with a determination that one or more third criteria are satisfied, displaying, in the map user interface, a confirmation user interface for confirming a presence of the respective temporary characteristic at the respective location; and
while displaying the confirmation user interface and without receiving user input for confirming the presence of the respective temporary characteristic at the respective location, initiating a process to confirm the presence of the respective temporary characteristic at the respective location.

6. The method of claim 1, further comprising:
while displaying the map user interface, in accordance with the determination that the one or more first criteria are satisfied:
in accordance with the determination that the respective temporary characteristic is of the first type, concurrently displaying, in the map user interface, a second user interface that indicates that the respective temporary characteristic is upcoming and the visual indication of the respective temporary characteristic displayed at the respective location on the representation of the map.

7. The method of claim 6, wherein the second user interface includes a visual indication of a number of users that have reported the respective temporary characteristic at the respective location, and the first user interface includes a visual indication of a number of users that have reported the respective temporary characteristic at the respective location.

8. The method of claim 1, wherein the visual indication of the distance corresponding to where the respective temporary characteristic is located does not change in accordance with a respective change in distance between the electronic device and the location of the respective temporary characteristic.

9. The method of claim 8, wherein the visual indication of the distance corresponding to where the respective temporary characteristic is located changes in response to a threshold time period being reached.

10. The method of claim 1, wherein the distance corresponding to where the respective temporary characteristic is located is offset by a respective amount from a distance to where the respective location associated with the respective temporary characteristic is located.

11. The method of claim 10, wherein the visual indication of the distance corresponding to where the respective temporary characteristic is located changes in accordance with a respective change in distance between the electronic device and the location of the respective temporary characteristic while maintaining the offset of the respective amount between the visual indication of the distance corresponding to where the respective temporary characteristic is located and where the respective location associated with the respective temporary characteristic is located.

12. An electronic device, comprising:
one or more processors;
memory; and
one or more programs, wherein the one or more programs are stored in the memory and configured to be executed by the one or more processors, the one or more programs including instructions for:
displaying, via a display generation component, a map user interface including a representation of a map, wherein the representation of the map includes a respective location associated with a respective temporary characteristic, wherein:
in accordance with a determination that the respective temporary characteristic is of a first type, the representation of the map includes a visual indication of the respective temporary characteristic displayed at the respective location on the representation of the map, and
in accordance with a determination that the respective temporary characteristic is of a second type, different from the first type, the representation of the map does not include the visual indication of the respective temporary characteristic displayed at the respective location on the representation of the map; and
in accordance with a determination that one or more first criteria are satisfied:
in accordance with the determination that the respective temporary characteristic is of the second type, concurrently displaying, in the map user interface, a first user interface that indicates that the respective temporary characteristic is upcoming, wherein the first user interface includes a visual indication of a distance corresponding to where the respective temporary characteristic is located, without including the visual indication of the respective temporary characteristic displayed at the respective location on the representation of the map, and wherein the distance is to a location different from where the respective location associated with the respective temporary characteristic is located.

13. The electronic device of claim 12, wherein the map user interface is displaying navigation directions, and in accordance with the determination that the respective temporary characteristic is of the first type, the representation of the map includes the visual indication of the respective temporary characteristic displayed at the respective location on the representation of the map while the map user interface is displaying the navigation directions.

14. The electronic device of claim 12, wherein the one or more programs include instructions for:
while displaying the map user interface:
in accordance with a determination that one or more second criteria are satisfied:
in accordance with the determination that the respective temporary characteristic is of the first type and that one or more third criteria are satisfied, displaying, in the map user interface, a confirmation user interface for confirming a presence of the respective temporary characteristic at the respective location; and
in accordance with the determination that the respective temporary characteristic is of the second type, forgoing displaying a confirmation user interface for confirming a presence of the respective temporary characteristic at the respective location.

15. The electronic device of claim 14, wherein the one or more programs include instructions for:
while displaying the map user interface:
in accordance with the determination that the one or more second criteria are satisfied:
in accordance with the determination that the respective temporary characteristic is of the first type and that the one or more third criteria are not satisfied, forgoing displaying the confirmation user interface for confirming the presence of the respective temporary characteristic at the respective location.

16. The electronic device of claim 12, wherein the one or more programs include instructions for:
while displaying the map user interface:
in accordance with a determination that one or more second criteria are satisfied:
in accordance with a determination that one or more third criteria are satisfied, displaying, in the map user interface, a confirmation user interface for confirming a presence of the respective temporary characteristic at the respective location; and
while displaying the confirmation user interface and without receiving user input for confirming the presence of the respective temporary characteristic at the respective location, initiating a process to confirm the presence of the respective temporary characteristic at the respective location.

17. The electronic device of claim 12, wherein the one or more programs include instructions for:
while displaying the map user interface, in accordance with the determination that the one or more first criteria are satisfied:
in accordance with the determination that the respective temporary characteristic is of the first type, concurrently displaying, in the map user interface, a second user interface that indicates that the respective temporary characteristic is upcoming and the visual indication of the respective temporary characteristic displayed at the respective location on the representation of the map.

18. The electronic device of claim 17, wherein the second user interface includes a visual indication of a number of users that have reported the respective temporary characteristic at the respective location, and the first user interface includes a visual indication of a number of users that have reported the respective temporary characteristic at the respective location.

19. The electronic device of claim 12, wherein the visual indication of the distance corresponding to where the respective temporary characteristic is located does not change in accordance with a respective change in distance between the electronic device and the location of the respective temporary characteristic.

20. The electronic device of claim 19, wherein the visual indication of the distance corresponding to where the respective temporary characteristic is located changes in response to a threshold time period being reached.

21. The electronic device of claim 12, wherein the distance corresponding to where the respective temporary characteristic is located is offset by a respective amount from a distance to where the respective location associated with the respective temporary characteristic is located.

22. The electronic device of claim 21, wherein the visual indication of the distance corresponding to where the respective temporary characteristic is located changes in accordance with a respective change in distance between the electronic device and the location of the respective temporary characteristic while maintaining the offset of the respective amount between the visual indication of the distance corresponding to where the respective temporary characteristic is located and where the respective location associated with the respective temporary characteristic is located.

23. A non-transitory computer readable storage medium storing one or more programs, the one or more programs comprising instructions, which when executed by one or more processors of an electronic device, cause the electronic device to perform a method comprising:
displaying, via a display generation component, a map user interface including a representation of a map, wherein the representation of the map includes a respective location associated with a respective temporary characteristic, wherein:
in accordance with a determination that the respective temporary characteristic is of a first type, the representation of the map includes a visual indication of the respective temporary characteristic displayed at the respective location on the representation of the map, and
in accordance with a determination that the respective temporary characteristic is of a second type, different from the first type, the representation of the map does not include the visual indication of the respective temporary characteristic displayed at the respective location on the representation of the map, and
in accordance with a determination that one or more first criteria are satisfied:
in accordance with the determination that the respective temporary characteristic is of the second type, concurrently displaying, in the map user interface, a first user interface that indicates that the respective temporary characteristic is upcoming, wherein the first user interface includes a visual indication of a distance corresponding to where the respective temporary characteristic is located, without including the visual indication of the respective temporary characteristic displayed at the respective location on the representation of the map, and wherein the distance is to a location different from where the respective location associated with the respective temporary characteristic is located.

24. The medium of claim 23, wherein the visual indication of the distance corresponding to where the respective temporary characteristic is located does not change in accordance with a respective change in distance between the electronic device and the location of the respective temporary characteristic.

25. The medium of claim 24, wherein the visual indication of the distance corresponding to where the respective temporary characteristic is located changes in response to a threshold time period being reached.

26. The medium of claim 23, wherein the distance corresponding to where the respective temporary characteristic is located is offset by a respective amount from a distance to where the respective location associated with the respective temporary characteristic is located.

27. The medium of claim 26, wherein the visual indication of the distance corresponding to where the respective temporary characteristic is located changes in accordance with a respective change in distance between the electronic device and the location of the respective temporary characteristic while maintaining the offset of the respective amount between the visual indication of the distance corresponding to where the respective temporary characteristic is located and where the respective location associated with the respective temporary characteristic is located.

28. The medium of claim 23, wherein the map user interface is displaying navigation directions, and in accordance with the determination that the respective temporary characteristic is of the first type, the representation of the map includes the visual indication of the respective temporary characteristic displayed at the respective location on the representation of the map while the map user interface is displaying the navigation directions.

29. The medium of claim 23, wherein the method comprises:
while displaying the map user interface:
in accordance with a determination that one or more second criteria are satisfied:
in accordance with the determination that the respective temporary characteristic is of the first type and that one or more third criteria are satisfied, displaying, in the map user interface, a confirmation user interface for confirming a presence of the respective temporary characteristic at the respective location; and
in accordance with the determination that the respective temporary characteristic is of the second type, forgoing displaying a confirmation user interface for confirming a presence of the respective temporary characteristic at the respective location.

30. The medium of claim 29, wherein the method comprises:
while displaying the map user interface:
in accordance with the determination that the one or more second criteria are satisfied:
in accordance with the determination that the respective temporary characteristic is of the first type and that the one or more third criteria are not satisfied, forgoing displaying the confirmation user interface for confirming the presence of the respective temporary characteristic at the respective location.

31. The medium of claim 23, wherein the method comprises:
while displaying the map user interface:
in accordance with a determination that one or more second criteria are satisfied:
in accordance with a determination that one or more third criteria are satisfied, displaying, in the map user interface, a confirmation user interface for confirming a presence of the respective temporary characteristic at the respective location; and
while displaying the confirmation user interface and without receiving user input for confirming the presence of the respective temporary characteristic at the respective location, initiating a process to confirm the presence of the respective temporary characteristic at the respective location.

32. The medium of claim 23, wherein the method comprises:
while displaying the map user interface, in accordance with the determination that the one or more first criteria are satisfied:
in accordance with the determination that the respective temporary characteristic is of the first type, concurrently displaying, in the map user interface, a second user interface that indicates that the respective temporary characteristic is upcoming and the visual indication of the respective temporary characteristic displayed at the respective location on the representation of the map.

33. The medium of claim 32, wherein the second user interface includes a visual indication of a number of users that have reported the respective temporary characteristic at the respective location, and the first user interface includes a visual indication of a number of users that have reported the respective temporary characteristic at the respective location.

* * * * *